US012191614B2

(12) United States Patent
Cavallieri et al.

(10) Patent No.: US 12,191,614 B2
(45) Date of Patent: Jan. 7, 2025

(54) HEADER POWER CONNECTOR

(71) Applicants: TE Connectivity Services GmbH, Schaffhausen (CH); TE CONNECTIVITY BRASIL INDUSTRIA DE ELECTRONICOS LTDA, Braganca Paulista (BR)

(72) Inventors: Amadeu Luiz Fazani Cavallieri, Sao Paulo (BR); David James Rhein, Memphis, MI (US)

(73) Assignees: TE Connectivity Brasil Industria De Eletronicos Ltda. (BR); TE Connectivity Solutions GmbH (CH)

(*) Notice: Subject to any disclaimer, the term of this patent is extended or adjusted under 35 U.S.C. 154(b) by 370 days.

(21) Appl. No.: 17/856,101

(22) Filed: Jul. 1, 2022

(65) Prior Publication Data

US 2023/0064661 A1 Mar. 2, 2023

Related U.S. Application Data

(63) Continuation-in-part of application No. 17/412,917, filed on Aug. 26, 2021, now Pat. No. 11,848,518.

(51) Int. Cl.

| | |
|---|---|
| ***H01R 25/16*** | (2006.01) |
| ***H01R 9/26*** | (2006.01) |
| ***H01R 13/514*** | (2006.01) |
| ***H01R 13/629*** | (2006.01) |

(52) U.S. Cl.
CPC ............... *H01R 25/16* (2013.01); *H01R 9/26* (2013.01); *H01R 13/514* (2013.01); *H01R 13/629* (2013.01)

(58) Field of Classification Search
CPC .. H01R 13/6315; H01R 13/11; H01R 13/187; H01R 13/502; H01R 13/514; H01R 13/629; H01R 25/16; H01R 9/26
USPC ........................................ 439/249, 251, 787
See application file for complete search history.

(56) References Cited

U.S. PATENT DOCUMENTS 3,723,940 A * 3/1973 Leonard .................. H01H 1/42 439/823
4,121,067 A * 10/1978 Rexroad ................ H02B 11/04 200/290
4,310,210 A * 1/1982 Takahashi ............ H01R 13/112 439/247
4,423,917 A * 1/1984 Scheingold ........ H01R 13/6315 439/249
4,445,732 A * 5/1984 Wafer ...................... H01H 1/54 439/38
4,453,792 A * 6/1984 Bright .................... H01R 31/00 439/251

(Continued)

OTHER PUBLICATIONS

International Search Report, International App. No PCT/IB2022/058021 International Filing Date Aug. 26, 2021.

*Primary Examiner* — Marcus E Harcum

(57) ABSTRACT

A header power connector includes a header housing assembly including an outer housing having cavities that receive corresponding inner housings, which hold terminals for electrically connecting upper and lower busbars. The inner housings are movable relative to the outer housing to accommodate misalignment of the corresponding upper and lower busbars. The terminals are movable in the terminal channels of the inner housings to accommodate misalignment of the corresponding upper and lower busbars.

20 Claims, 14 Drawing Sheets

(56) References Cited

U.S. PATENT DOCUMENTS

| | | | | | |
|---|---|---|---|---|---|
| 4,555,604 | A * | 11/1985 | Maier | H02B 11/04 200/290 |
| 4,621,303 | A * | 11/1986 | Rowe | H02B 11/04 200/260 |
| 4,983,132 | A * | 1/1991 | Weidler | H01R 25/162 439/786 |
| 5,013,265 | A * | 5/1991 | Buchter | H01R 25/162 439/744 |
| 5,098,318 | A * | 3/1992 | Suter | H02B 11/04 200/255 |
| 5,556,286 | A * | 9/1996 | Ikesugi | H01R 12/73 439/31 |
| 6,139,347 | A * | 10/2000 | Nebon | H02B 11/04 439/821 |
| 7,549,882 | B2 * | 6/2009 | Kimura | H01R 13/6315 439/260 |
| 7,581,972 | B2 * | 9/2009 | Daamen | H01R 13/6315 439/249 |
| 7,909,663 | B1 * | 3/2011 | Bouffet | H01R 13/18 439/787 |
| 8,926,352 | B2 * | 1/2015 | Wang | H01R 12/57 439/250 |
| 8,998,618 | B2 * | 4/2015 | Hashiguchi | H01R 13/113 439/787 |
| 9,455,515 | B2 * | 9/2016 | Ebisawa | H01R 4/48 |
| 10,522,945 | B2 * | 12/2019 | Schneider | H01R 13/10 |
| 10,622,768 | B1 * | 4/2020 | Cowham | H01R 24/28 |
| 10,763,607 | B2 | 9/2020 | Schneider | |
| 10,998,675 | B2 | 5/2021 | Lynch et al. | |
| 2005/0221690 | A1 * | 10/2005 | Suzuki | H01R 12/88 439/843 |
| 2012/0156909 | A1 | 6/2012 | Tyler | |
| 2014/0329398 | A1 | 11/2014 | Ebisawa | |
| 2015/0133003 | A1 * | 5/2015 | Ebisawa | H01R 13/639 439/817 |
| 2018/0034219 | A1 * | 2/2018 | Tyler | H01R 13/447 |
| 2019/0305459 | A1 | 10/2019 | Mori et al. | |
| 2021/0194191 | A1 * | 6/2021 | Mitter | H01R 35/04 |
| 2022/0209450 | A1 * | 6/2022 | Jung | H01R 13/187 |
| 2023/0208078 | A1 * | 6/2023 | Behling | H01R 4/48 439/248 |

* cited by examiner

HEADER POWER CONNECTOR

CROSS REFERENCE TO RELATED APPLICATIONS

This application is a continuation-in-part application of U.S. application Ser. No. 17/412,917, filed 26 Aug. 2021, titled "HEADER POWER CONNECTOR", the subject matter of which is herein incorporated by reference in its entirety.

BACKGROUND OF THE INVENTION

The subject matter herein relates generally to header power connectors.

Power connectors are used to transfer power between electrical components. For example, in an electric vehicle, a power connector is used to electrically connect an inverter with an electric motor. Typically, the power is supplied by coupling a cable mounted plug connector to a header power connector. The plug connector may be manipulated and moved into position for mating with the header power connector. The plug connector increases overall cost of the system being an extra component extending between the electrical components. There is a desire to directly couple the electrical components to the header power connector, such as to eliminate the plug connector and thus reduce the number of components and the cost of the system. However, alignment of the electrical components with the header power connector is difficult and may lead to improper mating and damage to the components.

A need remains for a header power connector having improved mating tolerances.

BRIEF DESCRIPTION OF THE INVENTION

In one embodiment, a header power connector is provided and includes a header housing assembly including an outer housing having a first cavity and a second cavity. The header housing assembly includes a first inner housing received in the first cavity and a second inner housing received in the second cavity. The first inner housing includes a first terminal channel. The second inner housing includes a second terminal channel. The first and second inner housings configured to receive upper busbars. The first and second inner housings configured to receive lower busbars. The first inner housing is movable relative to the outer housing in the first cavity to accommodate misalignment of the corresponding upper and lower busbars in the first terminal channel and the second inner housing is movable relative to the outer housing in the second cavity to accommodate misalignment of the corresponding upper and lower busbars in the second terminal channel. The header power connector includes a first terminal received in the first terminal channel. The first terminal includes an upper mating end having an upper socket configured to receive the corresponding upper busbar and a lower mating end has a lower socket configured to receive the corresponding lower busbar. The first terminal is configured to electrically connect the corresponding upper and lower busbars. The first terminal is movable in the first terminal channel to accommodate misalignment of the corresponding upper and lower busbars in the first terminal channel. The header power connector includes a second terminal received in the second terminal channel. The second terminal includes an upper mating end having an upper socket configured to receive the corresponding upper busbar and a lower mating end has a lower socket configured to receive the corresponding lower busbar. The second terminal is configured to electrically connect the corresponding upper and lower busbars. The second terminal is movable in the second terminal channel to accommodate misalignment of the corresponding upper and lower busbars in the second terminal channel.

In another embodiment, a header power connector is provided and includes a header housing assembly including an outer housing having a first cavity and a second cavity. The header housing assembly includes a first inner housing received in the first cavity and a second inner housing received in the second cavity. The first inner housing includes a first terminal channel. The second inner housing includes a second terminal channel. The first and second inner housings configured to receive upper busbars. The first and second inner housings configured to receive lower busbars. The header power connector includes a first terminal received in the first terminal channel. The first terminal includes an upper mating end having an upper socket configured to receive the corresponding upper busbar and a lower mating end has a lower socket configured to receive the corresponding lower busbar. The first terminal is configured to electrically connect the corresponding upper and lower busbars. The header power connector includes a second terminal received in the second terminal channel. The second terminal includes an upper mating end having an upper socket configured to receive the corresponding upper busbar and a lower mating end has a lower socket configured to receive the corresponding lower busbar. The second terminal is configured to electrically connect the corresponding upper and lower busbars. The first inner housing is movable at various tilt angles relative to the outer housing between a positive inner housing tilt position and a negative inner housing tilt position. The first inner housing is positionable at a no-tilt angle centered between the positive inner housing tilt position and the negative inner housing tilt position. The first inner housing movable relative to the outer housing to accommodate misalignment of the corresponding upper and lower busbars in the first terminal channel. The second inner housing is movable at various tilt angles relative to the outer housing between a positive inner housing tilt position and a negative inner housing tilt position. The second inner housing is positionable at a no-tilt angle centered between the positive inner housing tilt position and the negative inner housing tilt position. The second inner housing movable relative to the outer housing to accommodate misalignment of the corresponding upper and lower busbars in the second terminal channel. The first terminal is movable in the first terminal channel at various tilt angles relative to the first inner housing between a positive terminal tilt position and a negative terminal tilt position. The first terminal is positionable at a no-tilt angle centered between the positive terminal tilt position and the negative terminal tilt position. The first terminal movable relative to the first inner housing to accommodate misalignment of the corresponding upper and lower busbars in the first terminal channel. The second terminal is movable in the second terminal channel at various tilt angles relative to the second inner housing between a positive terminal tilt position and a negative terminal tilt position. The second terminal is positionable at a no-tilt angle centered between the positive terminal tilt position and the negative terminal tilt position. The second terminal movable relative to the second inner housing to accommodate misalignment of the corresponding upper and lower busbars in the second terminal channel.

In a further embodiment, a power connector system is provided and includes a first upper busbar and a second upper busbar for powering a first electrical component. The first and second upper busbars have upper busbar edges. The power connector system includes a first lower busbar and a second lower busbar for powering a second electrical component. The first and second lower busbars have lower busbar edges. The power connector system includes a header power connector for electrically connecting the first and second upper busbars with the first and second lower busbars. The header power connector includes a header housing assembly including an outer housing having a first cavity and a second cavity. The header housing assembly includes a first inner housing received in the first cavity and a second inner housing received in the second cavity. The first inner housing includes a first terminal channel. The second inner housing includes a second terminal channel. The first inner housing receiving the first upper busbar and the first lower busbar. The second inner housing receiving the second upper busbar and the second lower busbar. The first inner housing is movable relative to the outer housing in the first cavity to accommodate misalignment of the first upper and lower busbars in the first terminal channel. The second inner housing being movable relative to the outer housing in the second cavity to accommodate misalignment of the second upper and lower busbars in the second terminal channel. The header power connector includes a first terminal received in the first terminal channel. The first terminal includes an upper mating end has an upper socket configured to receive the first upper busbar and a lower mating end has a lower socket configured to receive the first lower busbar. The first terminal is configured to electrically connect the first upper and lower busbars. The first terminal is movable in the first terminal channel to accommodate misalignment of the first upper and lower busbars in the first terminal channel. The header power connector includes a second terminal received in the second terminal channel. The second terminal includes an upper mating end having an upper socket configured to receive the second upper busbar and a lower mating end has a lower socket configured to receive the second lower busbar. The second terminal is configured to electrically connect the second upper and lower busbars. The second terminal is movable in the second terminal channel to accommodate misalignment of the second upper and lower busbars in the second terminal channel.

DETAILED DESCRIPTION OF THE INVENTION

Figure 1:
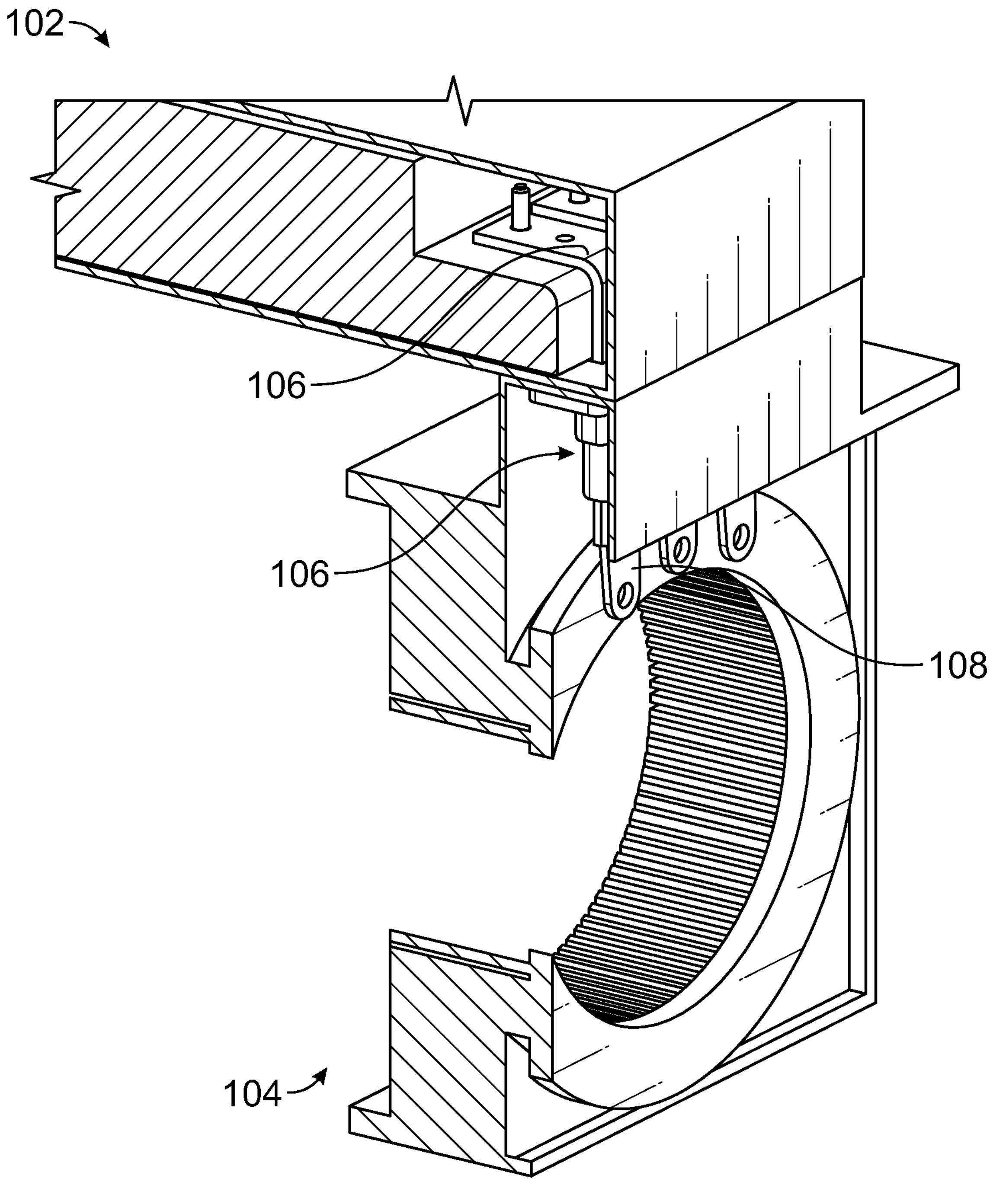
FIG. 1 is a schematic view of a header power connector in accordance with an exemplary embodiment.

FIG. 1 is a schematic view of a header power connector 100 in accordance with an exemplary embodiment. The header power connector 100 is used to electrically connect a first electrical component 102 and a second electrical component 104. In various embodiments, the first and second electrical components 102, 104 may be part of an electric vehicle. For example, the first electrical component 102 may be an inverter and the second electrical component 104 may be an electric motor. The header power connector 100 may be used to electrically connect other types of electrical components in alternative embodiments.

In an exemplary embodiment, the first electrical component 102 includes a first busbar 106 and the second electrical component 104 includes a second busbar 108. The first and second busbars 106, 108 are configured to be plugged directly into opposite ends of the header power connector 100. The header power connector 100 electrically connects the first and second busbars 106, 108 to transmit power between the first and second electrical components 102, 104.

Figure 2:
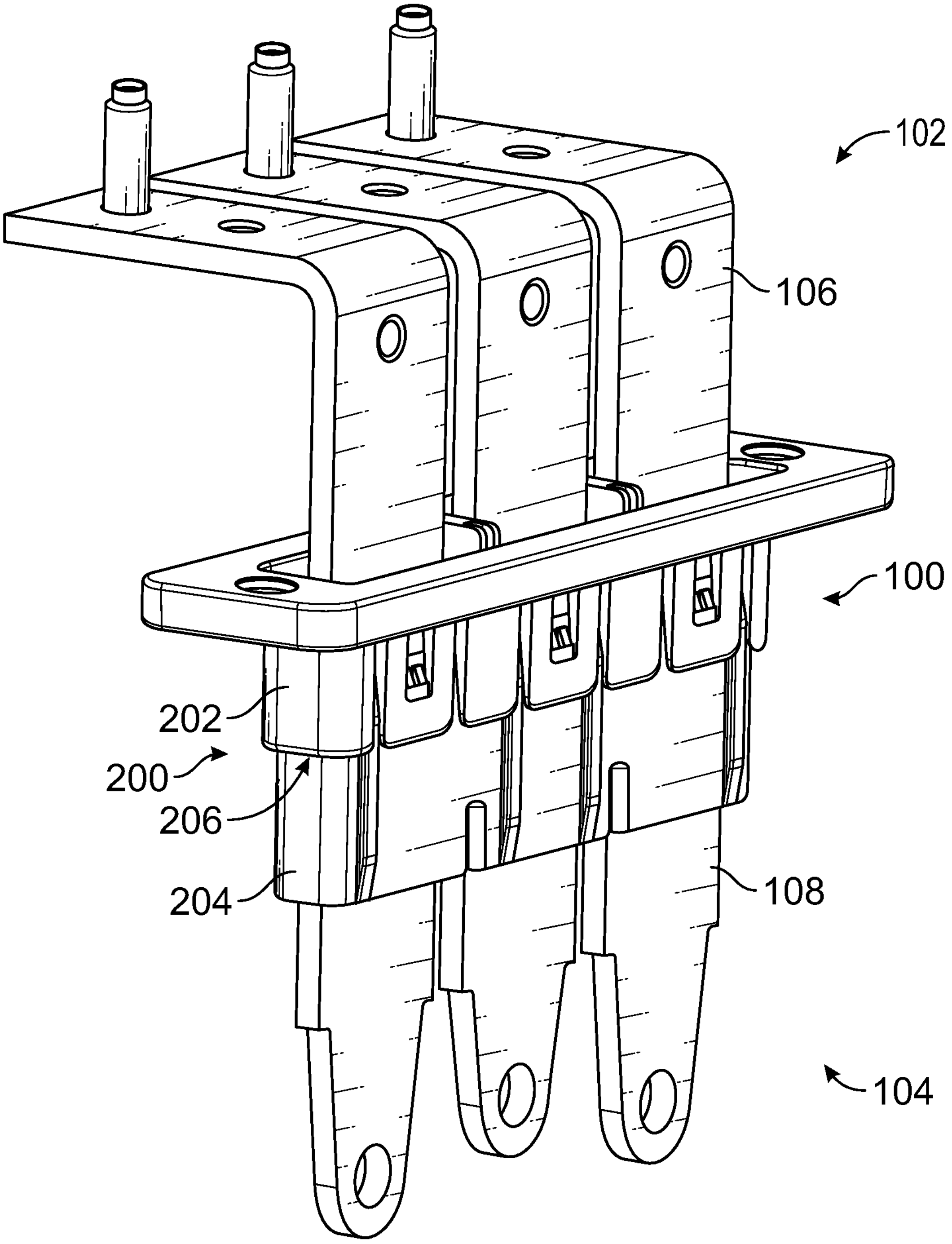
FIG. 2 is a perspective view of the header power connector in accordance with an exemplary embodiment.

FIG. 2 is a perspective view of the header power connector 100 in accordance with an exemplary embodiment. FIG. 2 illustrates portions of the first and second electrical components 102, 104. FIG. 2 illustrates the first and second busbars 106, 108. The first busbars 106 are metal plates, such as copper plates. The second busbars 108 are metal plates, such as copper plates. In the illustrated embodiment, the first electrical component 102 includes a plurality of the first busbars 106 and the second electrical component 104 includes a plurality of the second busbars 108.

The header power connector 100 is located between the first electrical component 102 and the second electrical component 104. The busbars 106 of the first electrical component 102 are configured to be plugged directly into the header power connector 100. The busbars 108 of the second electrical component 104 are configured to be plugged directly into the header power connector 100. Optionally, the header power connector 100 may be initially mounted to the first electrical component 102 (or the second electrical component 104) and mated to the second electrical component 104 (or the first electrical component 102) when the first electrical component 102 is mounted to the second electrical component 104.

The header power connector 100 includes a header housing assembly 200 and one or more terminals 300 (shown in FIG. 3) held by the header housing assembly 200. In an exemplary embodiment, the header housing assembly 200 is a multipiece housing assembly. For example, the header housing assembly 200 includes an outer housing 202 and an inner housing 204. The inner housing 204 holds the terminals 300. The inner housing 204 is received in a cavity 206 of the outer housing 202. In an exemplary embodiment, the outer housing 202 is configured to be mounted to one of the electrical components, such as the second electrical component 104. In an exemplary embodiment, the inner housing 204 is movable relative to the outer housing 202 to accommodate alignment and mating with the first electrical component 102. For example, the inner housing 204 may be tilted or rotated within the outer housing 202 to accommodate misalignment of the first and second busbars 106, 108. The inner housing 204 has a limited amount of contained movement relative to the outer housing 202. The outer housing 202 is shaped to control and contained the movement of the inner housing 204 during mating. For example, the outer housing 202 may allow the inner housing 204 to rotate a predetermined amount to allow mating with the busbars 106 of the first electrical component 102 during mating there with. In an exemplary embodiment, the terminals 300 also have a limited amount of contained movement relative to the inner housing 204 to accommodate the misalignment of the first and second busbars 106, 108 during mating.

Figure 3:
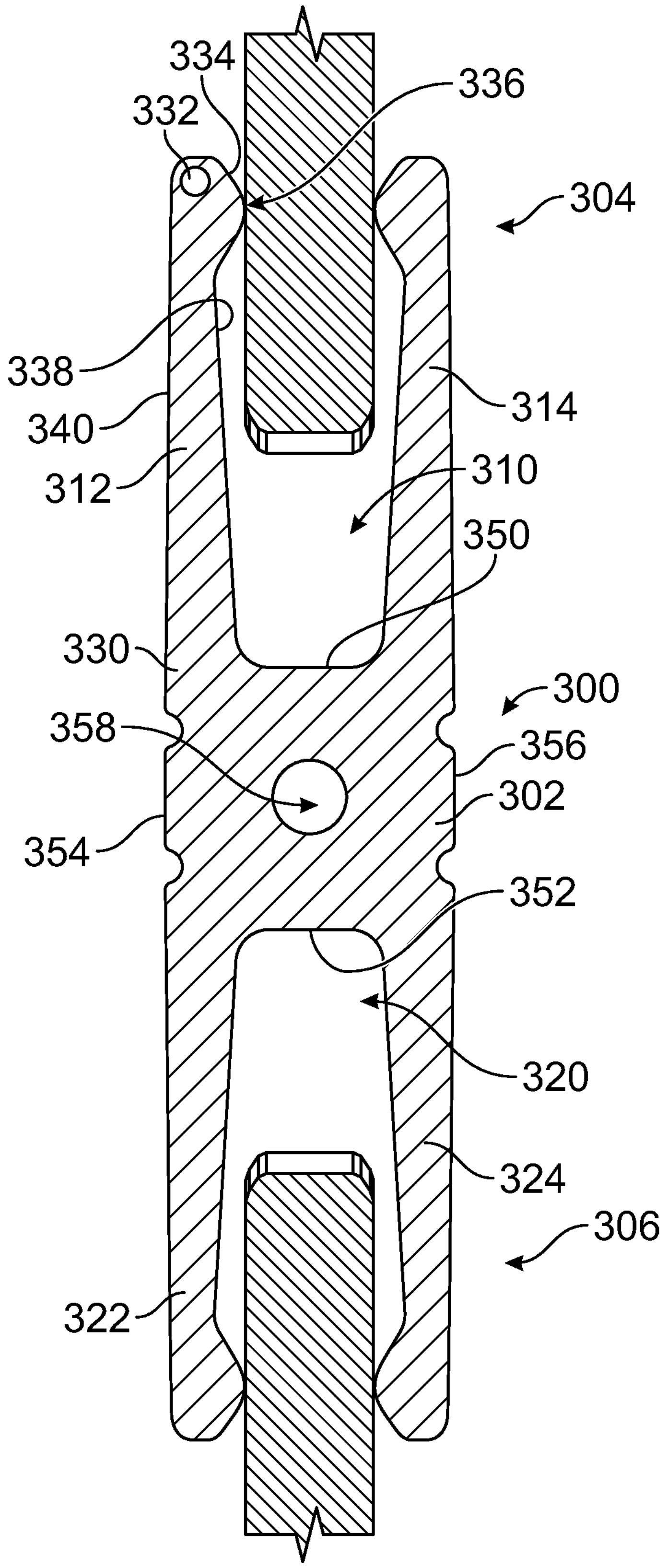
FIG. 3 is a side view of the terminal in accordance with an exemplary embodiment.

FIG. 3 is a side view of the terminal 300 in accordance with an exemplary embodiment. The terminal 300 is a double ended socket terminal configured to receive the first and second busbars 106, 108 (shown in FIG. 1) in opposite ends of the terminal 300. Other types of terminals may be used in alternative embodiments.

The terminal 300 is a stamped and formed terminal manufactured from a metal material, such as a copper material. The terminal 300 may have one or more plating layers, such as a nickel plating layer and/or a gold plating layer. The terminal 300 includes a terminal base 302, an upper mating end 304 at a first side of the terminal base 302, and a lower mating end 306 at a second side of the terminal base 302. Optionally, the upper mating end 304 and the lower mating end 306 may be identical.

The terminal 300 has an upper socket 310 at the upper mating end 304. The terminal 300 includes a first upper spring beam 312 extending along the first side of the upper socket 310 and a second upper spring beam 314 extending along the second side of the upper socket 310.

The terminal includes a lower socket 320 at the lower mating end 306. The terminal 300 includes a first lower spring beam 322 extending along the first side of the lower socket 320 and a second lower spring beam 324 extending along the second side of the lower socket 310.

In an exemplary embodiment, the spring beams 312, 314, 322, 324 may be identical to one another. The spring beams 312, 314, 322, 324 may be deflectable when mated to the corresponding busbars 106 or 108. For example, the spring beams 312, 314, 322, 324 may be deflected outward when mated to the busbar 106 or 108 to bias the spring beams 312, 314, 322, 324 inward to maintain electrical contact between the spring beams 312, 314, 322, 324 and the busbars 106 or 108.

In an exemplary embodiment, each spring beam 312, 314, 322, 324 includes a base 330 and a tip 332 at the distal end of the spring beam. The base 330 extends from the terminal base 302. Optionally, the spring beam may be widest at the base 330. In an exemplary embodiment, the spring beam narrows from the base 330 toward the tip 332. In an exemplary embodiment, the spring beam includes a bulge 334 near the tip 332. Optionally, the bulge 334 may be bulged inward. The bulge 334 has a curved surface defining a mating interface 336 configured to be mated with the corresponding busbar 106 or 108. The spring beam includes an inner surface 338 and an outer surface 340 opposite the inner surface 338. In various embodiments, the inner surface 338 and the outer surface 340 are tapered inward from the base 330 toward the tip 332. Optionally, the inner surface 338 may be tapered inward at a greater angle than the outer surface 340.

The terminal base 302 is located generally at the central portion of the terminal 300, such as between the upper mating end 304 and the lower mating end 306 the terminal base 302 includes an upper end 350 and a lower end 352. The terminal base 302 includes a first side 354 and a second side 356. The upper spring beams 312, 314 extend from the upper end 350 at the first and second sides 354, 356, respectively. The lower spring beams 322, 324 extend from the lower end 352 at the first and second sides 354, 356, respectively. In an exemplary embodiment, the terminal base 302 includes an opening 358 therethrough. Optionally, the opening 358 may be approximately centered between the upper end 350 and the lower end 352 and may be approximately centered between the first side 354 and the second side 356. The opening 358 may receive a portion of the header housing assembly 200 to locate and or retain the terminal 300 in the header housing assembly 200. For example, an axle may extend through the opening 358. Optionally, the terminal 300 may be rotatable about the axle, such as to shift the relative positions of the upper mating end 304 and the lower mating end 306.

Figure 4:
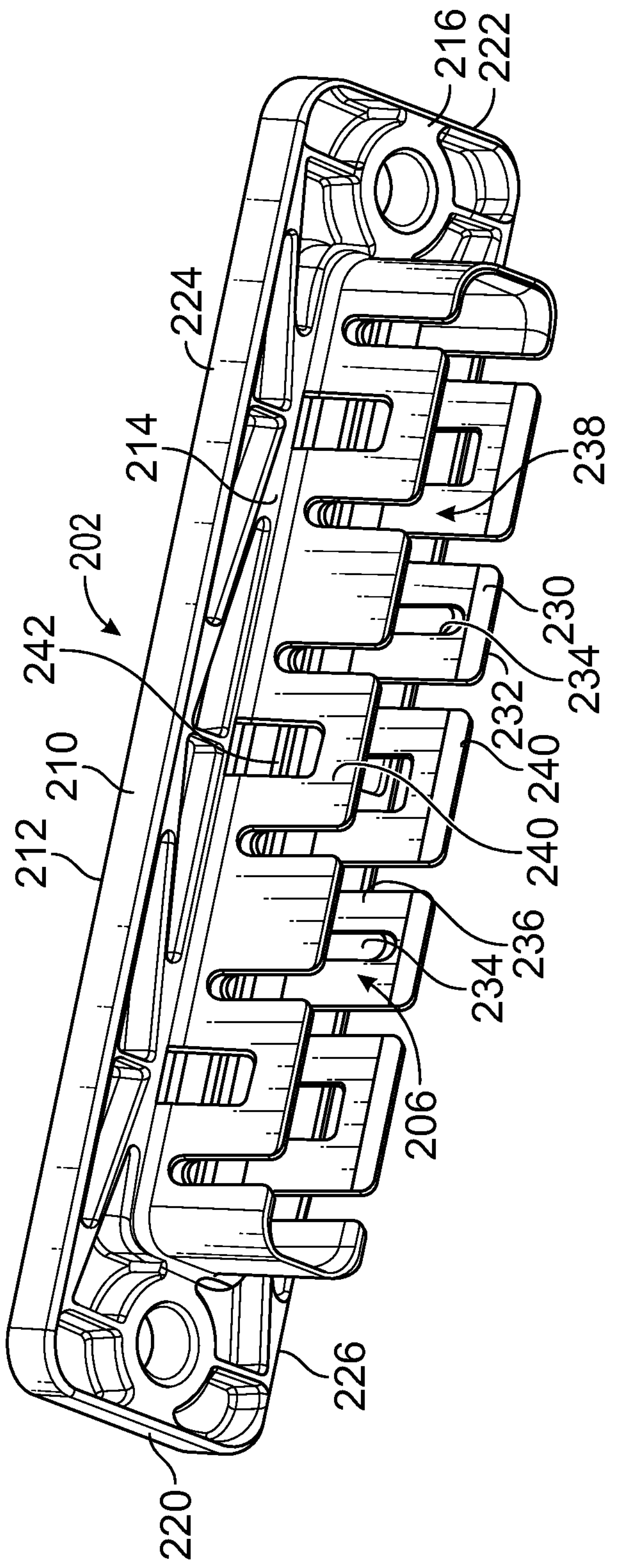
FIG. 4 is a bottom perspective view of the outer housing in accordance with an exemplary embodiment.

FIG. 4 is a bottom perspective view of the outer housing 202 in accordance with an exemplary embodiment. The outer housing 202 includes an outer wall 210 surrounding the cavity 206. The outer wall 210 extends between an upper end 212 and a lower end 214 of the outer housing 202. In an exemplary embodiment, the upper end 212 is configured to be mounted to the first electrical component 102 such that the header power connector 100 extends from the bottom of the first electrical connector 102. Other mounting orientations are possible in alternative embodiments. For example, the header power connector 100 may be oriented such that the end 212 defines a bottom of the outer housing 202, such as when the outer housing 202 is mounted to the top of the structure, such as one of the electrical components. In other various embodiments, the outer housing 202 may be oriented such that neither of the ends 212, 214 are at the top or the bottom, but rather define sides of the outer housing 202. The terms upper and lower are used herein in reference to the orientation illustrated in the figures.

The outer housing 202 includes mounting flanges 216 at opposite sides 220, 222 of the outer housing 202. The mounting flanges 216 may receive fasteners to secure the outer housing 202 to the first electrical component 102. The outer housing 202 includes a front 224 and a rear 226 extending between the sides 220, 222. The cavity 206 is formed between the front 224 and the rear 226. The cavity 206 extends between the first side 220 and the second side 222. The cavity 206 is open to receive the inner housing 204 (shown in FIG. 5).

The outer housing 202 includes support walls extending from the lower end 214. The support walls 230 are used to support the inner housing 204 in the cavity 206. Optionally, the support walls 230 are noncontinuous. For example, the support walls 230 may be separated by gaps. The support walls 230 are provided at the front 224 and the rear 226. Optionally, the support walls 230 may be provided at the first side 220 and the second side 222. The support walls 230 extend to edges 232. In the illustrated embodiment, the edges 232 are bottom edges. Optionally, the edges 232 may be chamfered to guide loading of the inner housing 204 into the cavity 206. The edges 232 may be chamfered to allow tilting of the inner housing 204 relative to the outer housing 202 in the cavity 206, such as to accommodate misalignment of the busbars 106, 108, as described in further detail below.

In an exemplary embodiment, the outer housing 202 includes connecting walls 234 extending between the front 224 and the rear 226. The connecting walls 234 extend across the cavity 206. The connecting walls 234 may connect the support walls 230 and/or the outer wall 210 at the front 224 and the rear 226. The connecting walls 234 divide the cavity 206 into the pockets 236. In an exemplary embodiment, each pocket 236 receives a corresponding busbar 106 and/or 108.

The outer housing 202 includes latching features 240 used to secure the inner housing 204 to the outer housing 202. In the illustrated embodiment, the latching features 240 are deflectable latching tabs configured to engage corresponding latching features of the inner housing 204. The latching features 240 may be releasable to release the inner housing 204 from the outer housing 202. In various embodiments, the latching features 240 are formed in the support walls 230. Alternatively, the latching features 240 may be separate from the support walls 230, such as interspersed between the support walls 230 within the gaps between the support walls 230. In the illustrated embodiment, the latching features 240 include openings 242. The openings are configured to engage the corresponding latching features of the inner housing 204. Other types of latching features may be used in alternative embodiments.

Figure 5:
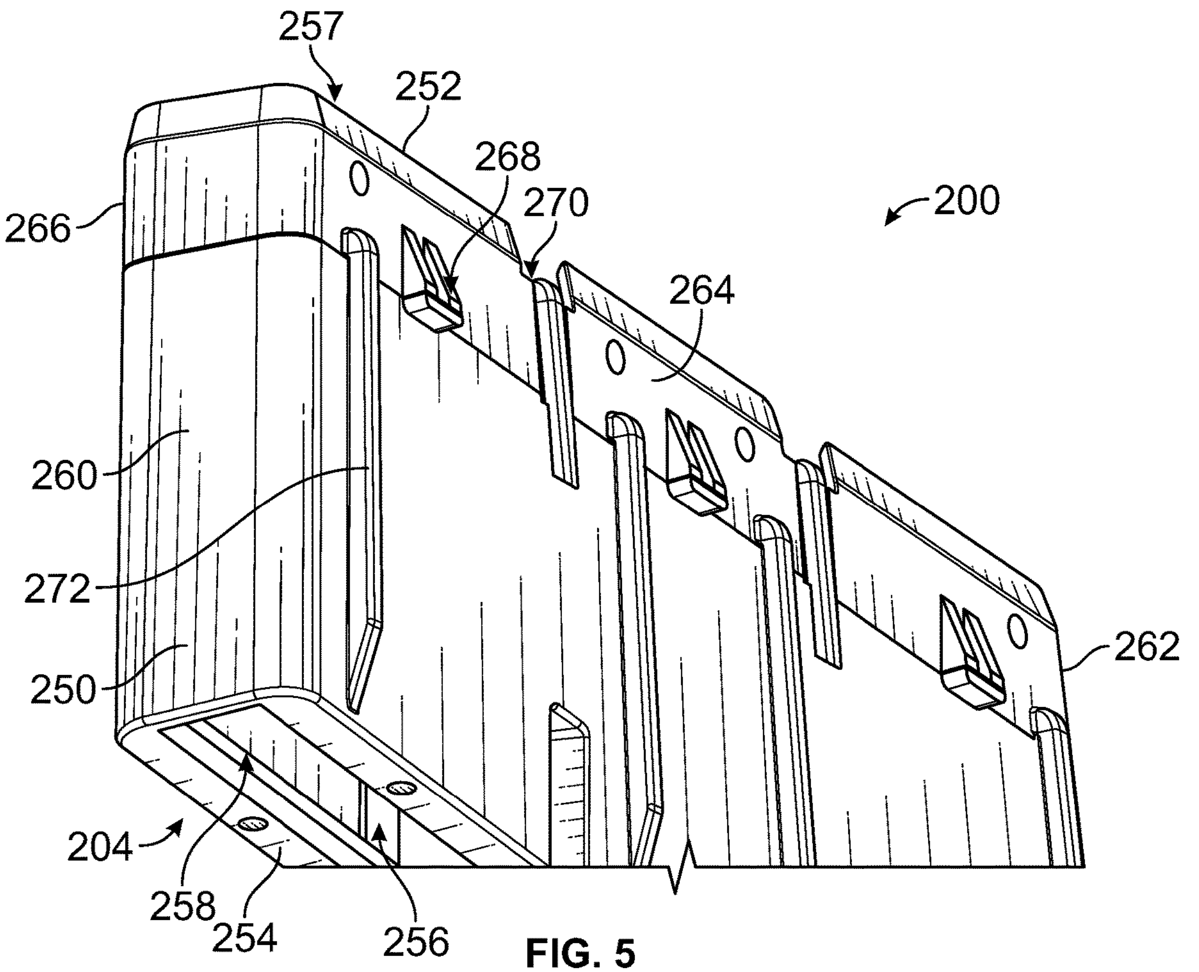
FIG. 5 is a bottom perspective view of the inner housing in accordance with an exemplary embodiment.

FIG. 5 is a bottom perspective view of the inner housing 204 in accordance with an exemplary embodiment. The inner housing 204 includes a plurality of inner walls 250 extending between an upper end 252 and a lower end 254. The inner walls 250 form terminal channels 256 configured to receive corresponding terminals 300 therein. The terminal channels 256 are open at the upper end 252 and the lower end 254 to receive the busbars 106, 108, respectively. For example, the inner housing 204 includes upper openings 257 (shown in FIG. 7) that receive the first busbars 106 and lower openings 258 that receive the second busbars 108. The inner walls 250 guide the busbars 106, 108 into the terminal channels 256 to mate with the terminals 300. Optionally, the upper openings 257 and/or the lower openings 258 may include chamfered lead-in surfaces that guide the busbars 106, 108 into the terminal channels 256.

The inner housing 204 includes a first side 260 and a second side 262 opposite the first side 260. The inner housing 204 includes a front 264 and a rear 266 extending between the sides 260, 262. In an exemplary embodiment, the inner housing 204 includes latching features 268 extending from the front 264 and/or the rear 266. The latching features 268 are configured to interface with the latching features 240 (shown in FIG. 4) of the outer housing 202 to secure the inner housing 204 in the cavity 206 of the outer housing 202. In the illustrated embodiment, the latching features 268 include latches each having a ramp surface at the top of the latch and a catch surface at the bottom of the latch. Other types of latching features may be provided in alternative embodiments.

In an exemplary embodiment, the inner housing 204 includes slots 270 open at the upper end 252. The slots 270 are configured to receive corresponding connecting walls 234 (shown in FIG. 4) of the outer housing 202 when the inner housing 204 is loaded into the cavity 206 of the outer housing 202. The slots 270 are used to locate the inner housing 204 relative to the outer housing 202 and control side to side positioning of the inner housing 204 relative to the outer housing 202.

In an exemplary embodiment, the inner housing 204 includes positioning ribs 272 extending from the front 264 and/or the rear 266. The positioning ribs 272 are configured to position the inner housing 204 relative to the outer housing 202. In an exemplary embodiment, the support walls 230 and the latching features 240 of the outer housing 202 (both shown in FIG. 4) are received in the spaces between the positioning ribs 272. In an exemplary embodiment, the positioning ribs 272 are configured to position the inner housing 204 for mating with the second electrical component 104. For example, the positioning ribs 272 may engage part of the second electrical component 104 to locate the header housing assembly 200 relative to the second electrical component 104.

Figure 6:
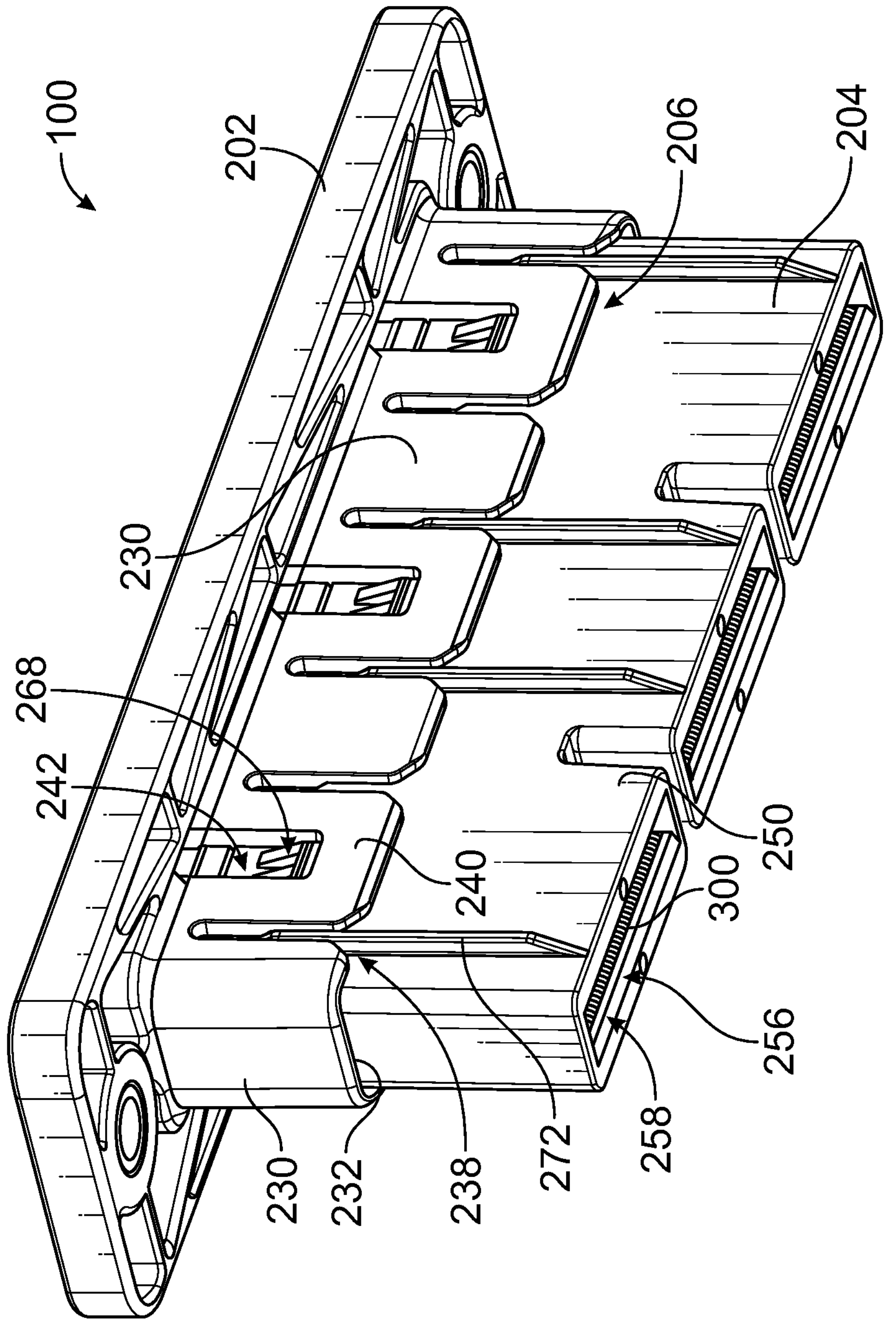
FIG. 6 is a bottom perspective view of the header power connector in accordance with an exemplary embodiment.

FIG. 6 is a bottom perspective view of the header power connector 100 in accordance with an exemplary embodiment. FIG. 6 illustrates the terminals 300 loaded in the terminal channels 256. FIG. 6 illustrates the inner housing 204 coupled to the outer housing 202. The inner housing 204 is loaded into the cavity 206 of the outer housing 202. The latching features 240 of the outer housing 202 engage the latching features 268 of the inner housing 204 to secure the inner housing 204 in the outer housing 202. For example, the latching features 268 are received in the openings 242 of the latching features 240. The positioning ribs 272 are used to locate the inner housing 204 relative to the outer housing 202. The positioning ribs 272 are received in the slots 238 between the support walls 230 and the latching features 240.

In an exemplary embodiment, the support walls 230 are relatively short compared to the overall height of the inner wall 250. For example, the support walls 230 may extend less than half the height of the inner wall 250. As such, the inner housing 204 is able to tilt or rotate within the cavity 206 relative to the support walls 230 to accommodate for misalignment of the first and second busbars 106, 108 (both shown in FIG. 1). The chamfered surfaces at the edges 232 of the support walls 230 allow the inner housing 204 to pivot relative to the outer housing 202 for plugging the second busbars 108 into the lower openings 258 of the inner housing 204.

Figure 7:
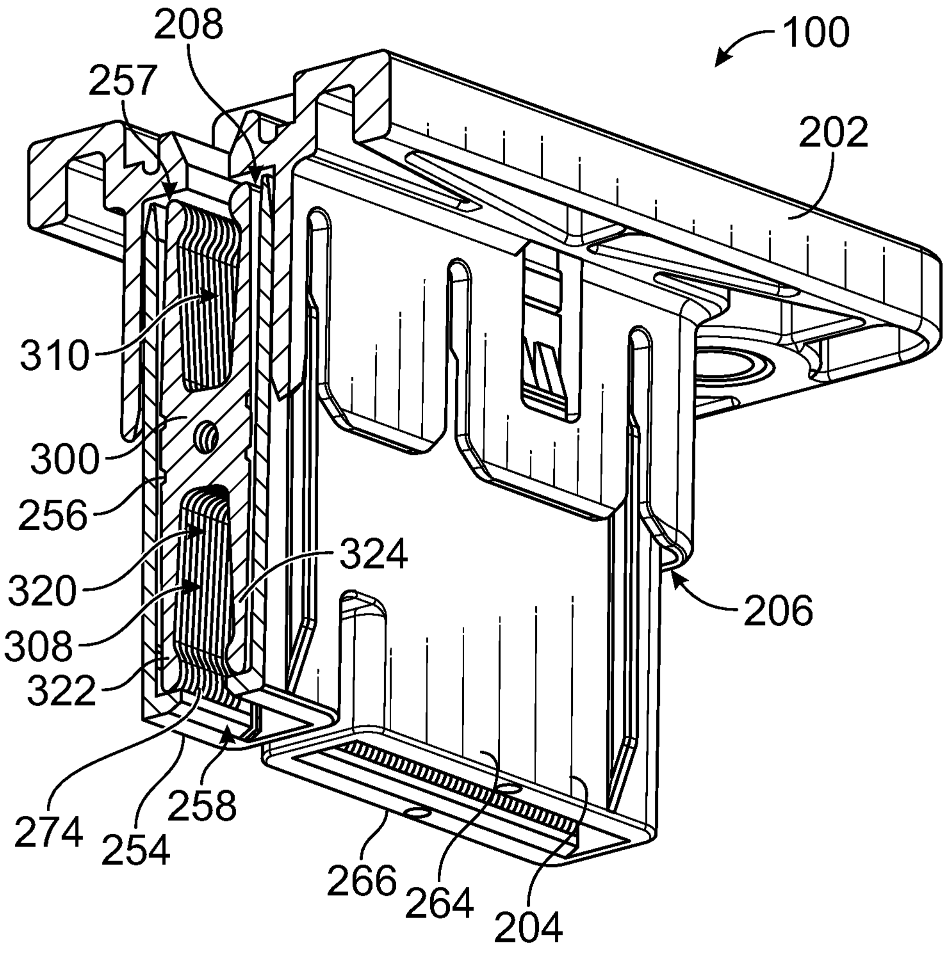
FIG. 7 is a bottom perspective, partial sectional view of the header power connector in accordance with an exemplary embodiment.

FIG. 7 is a bottom perspective, partial sectional view of the header power connector 100 in accordance with an exemplary embodiment. FIG. 7 illustrates the terminals 300 loaded in the terminal channels 256. In an exemplary embodiment, a plurality of the terminals 300 are stacked together in a terminal stack 308. Each terminal channel 256 of the inner housing 204 receives the corresponding terminal stack 308 of the terminals 300. The terminals 300 are arranged side-by-side in the terminal stack 308. The terminals 300 function as a single terminal assembly within the terminal stack 308. However, the terminals 300 are independently movable relative to each other. The terminals 300 may be stamped and formed from thin metal sheets, but stacked together to increase the overall current carrying capacity of the terminal assembly.

When assembled, the outer housing 202 and the inner housing 204 cooperate to form a pocket 208 that receives the corresponding terminal stack 308. The inner housing 204 holds the terminals 300 from below, from the sides, from the front, and from the rear, while the outer housing 202 holds the terminals 300 from above enclosing the pocket 208. In an exemplary embodiment, the inner housing 204 includes lips 274 at the lower end 254 extending inward from the front 264 and the rear 266. The lips 274 are provided on opposite sides of the lower opening 258. The lips 274 support the terminals 300 in the pocket 208. For example, the lips 274 support the first and second lower spring beams 322, 324. The lower opening 258 is aligned with the lower socket 320 to receive the second busbar 108. In an exemplary embodiment, the outer housing 202 includes an opening 244 aligned with the upper opening 257 of the inner housing 204. The opening 244 is aligned with the upper socket 310 to receive the first busbar 106. For example, the first busbar 106 passes through the opening 244 and through the upper opening 257 of the inner housing 204 into the terminal channel 256 to interface with the terminals 300.

In an exemplary embodiment, the terminal channel 256 is oversized relative to the terminal 300 to allow a limited amount of confined movement of the terminals 300 within the terminal channel 256. For example, the terminals 300 may be shifted front to rear and/or shifted side to side and/or rotated or pivoted top to bottom for mating with the first and second busbars 106, 108. For example, when the first and second busbars 106, 108 are offset from each other, the terminals 300 may be shifted or moved within the terminal channel 256 to accommodate for the misalignment. Similarly, the cavity 206 of the outer housing 202 is oversized relative to the inner housing 204 to allow a limited amount of confined movement of the inner housing 204 within the cavity 206. For example, the inner housing 204 may be shifted front to rear and/or shifted side to side and/or rotated or pivoted top to bottom for mating with the first and second busbars 106, 108. For example, when the first and second busbars 106, 108 are offset from each other, the inner housing 204 may be shifted or moved within the cavity 206 to accommodate for the misalignment.

Figure 8:
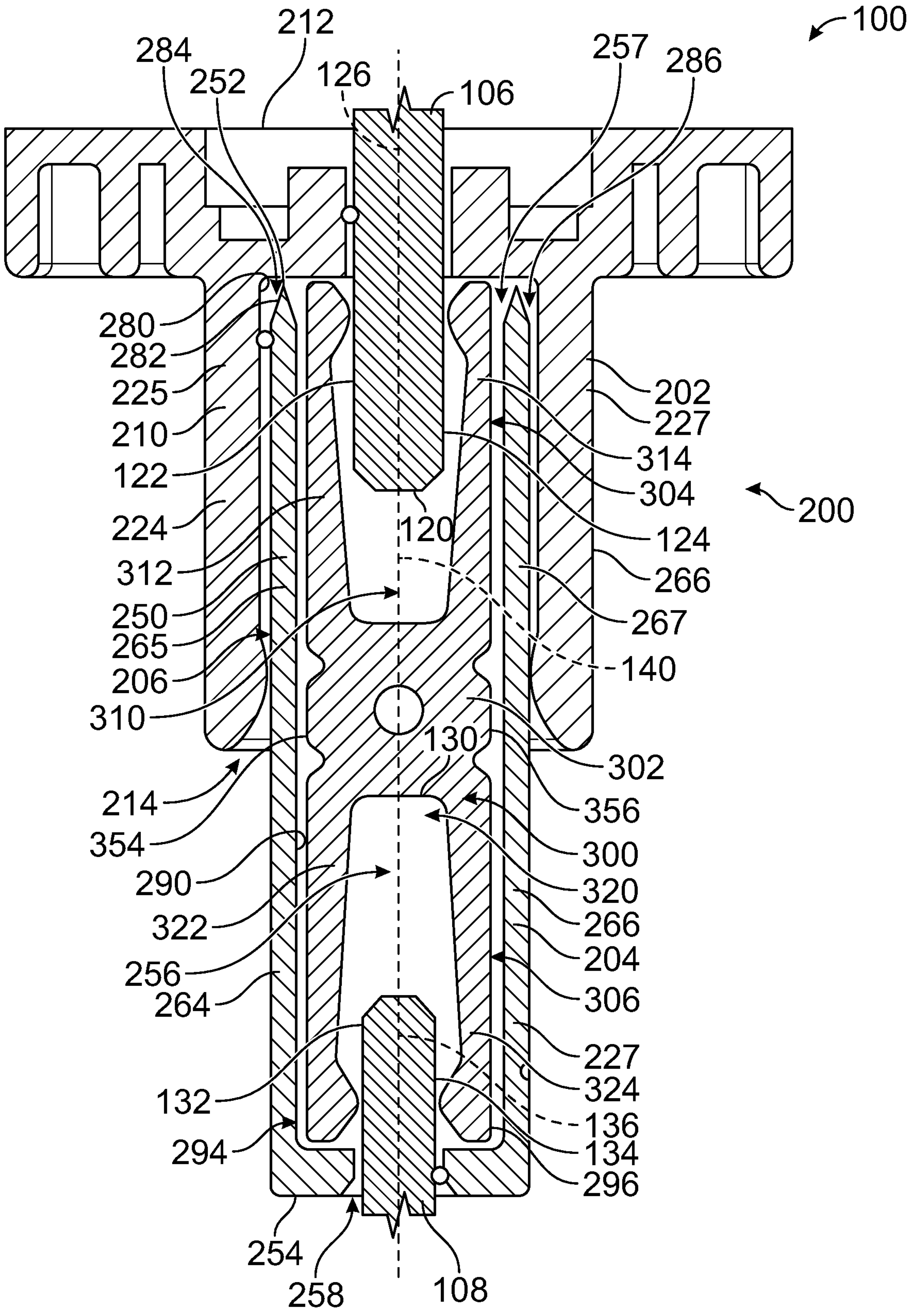
FIG. 8 is a cross-sectional view of the header power connector in accordance with an exemplary.
Figure 9:
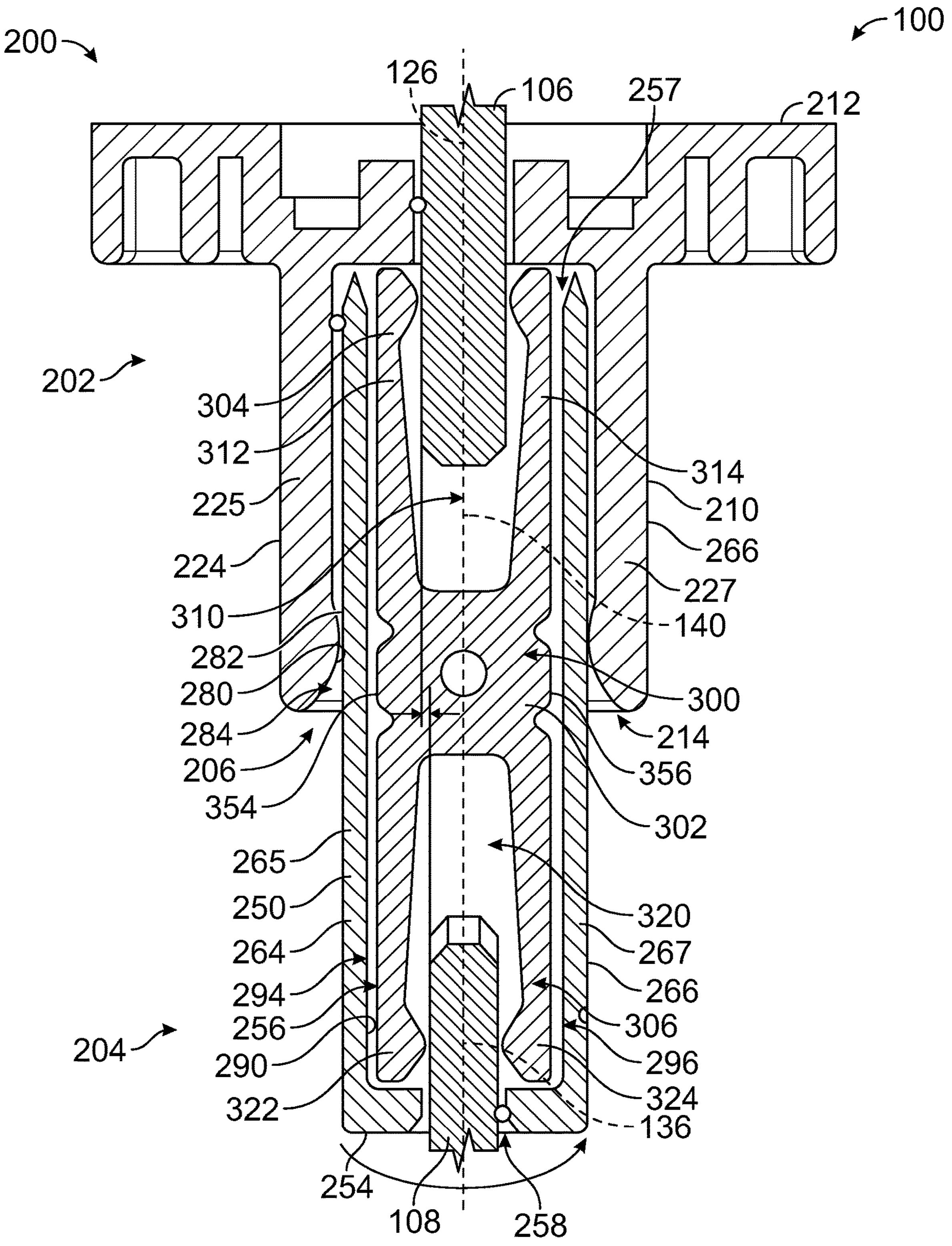
FIG. 9 is a cross-sectional view of the header power connector 100 in accordance with an exemplary embodiment.
Figure 10:
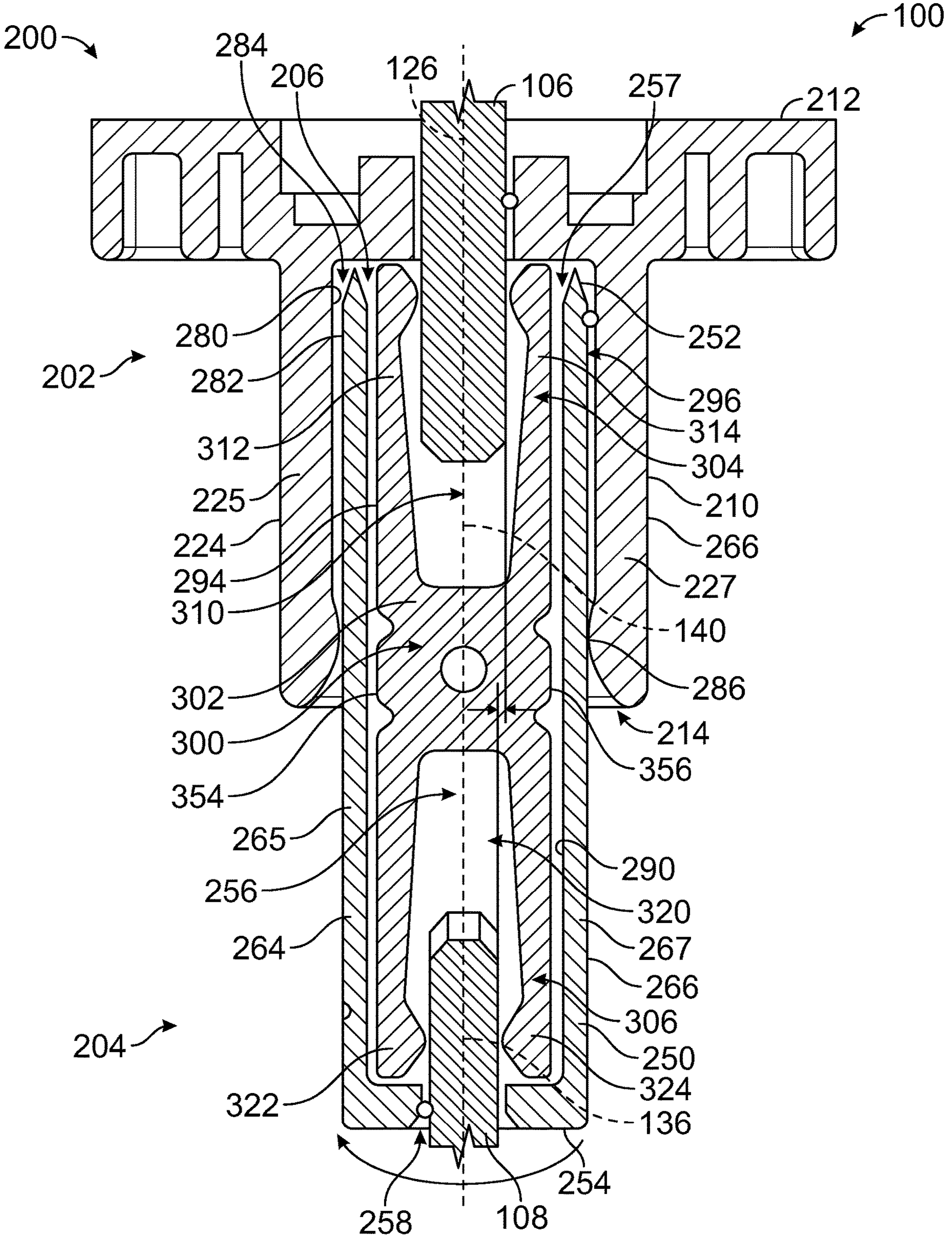
FIG. 10 is a cross-sectional view of the header power connector 100 in accordance with an exemplary embodiment.

FIG. 8 is a cross-sectional view of the header power connector 100 in accordance with an exemplary embodiment showing the header power connector 100 mated with the first and second busbars 106, 108 when the first and second busbars 106, 108 are aligned. FIG. 9 is a cross-sectional view of the header power connector 100 in accordance with an exemplary embodiment showing the header power connector 100 mated with the first and second busbars 106, 108 with the second busbar 108 offset in a first (right) direction. FIG. 10 is a cross-sectional view of the header power connector 100 in accordance with an exemplary embodiment showing the header power connector 100 mated with the first and second busbars 106, 108 with the second busbar 108 offset in a second (left) direction.

The first busbar 106 includes a first busbar edge 120 configured to be plugged into the header power connector 100. The first busbar 106 includes a first side 122 and a second side 124. The first busbar 106 extends along a first busbar axis 126. The first busbar axis 126 is centered between the first side 122 and the second side 124. In the illustrated embodiment, the first busbar axis 126 is oriented vertically; however, the first busbar axis 126 may be oriented at a skewed angle that is non-vertical. In alternative embodiments, the header power connector 100 may be oriented such that the first busbar 106 is mated in a different orientation, such as a horizontal orientation.

The second busbar 108 includes a second busbar edge 130 configured to be plugged into the header power connector 100. The second busbar 108 includes a first side 132 and a second side 134. Optionally, the second busbar 108 may have a width between the first and second sides 132, 134 is equal to the width of the first busbar 106. The second busbar 106 extends along a second busbar axis 136. The second busbar axis 136 is centered between the first side 132 and the second side 134. In the illustrated embodiment, the second busbar axis 136 is oriented vertically; however, the second busbar axis 136 may be oriented at a skewed angle that is non-vertical. In alternative embodiments, the header power connector 100 may be oriented such that the second busbar 108 is mated in a different orientation, such as a horizontal orientation.

When the first and second busbars 106, 108 are aligned (FIG. 8) (for example, the first busbar axis 126 being parallel to and coincident with the second busbar axis 136), the first and second busbars 106, 108 may be plugged directly into the terminal channel 256 to mate with the terminal 300.

Tolerances are built into the header power connector 100 to accommodate plugging the first and second busbars 106, 108 into the terminal channel 256. For example, tolerances are built into the outer housing 202 and the inner housing 204 and tolerances are built into the terminal 300 and the terminal channel 256 of the inner housing 204. In various embodiments, the cavity 206 is oversized relative to the inner housing 204 such that gaps are formed between inner surfaces 280 of the outer wall 210 and outer surfaces 282 of the inner wall 250. For example, a first cavity gap 284 may be provided between a first outer wall 225 at the front 224 of the outer housing 202 and a first inner wall 265 at the front 264 of the inner housing 204 and a second cavity gap 286 may be provided between a second outer wall 227 at the rear 226 of the outer housing 202 and a second inner wall 267 at the rear 266 of the inner housing 204. The cavity gaps 284, 286 are narrow compared to the overall width of the header housing assembly 200 but provides some play and movement between the inner housing 204 and the outer housing 202. In various embodiments, the terminal channel 256 is oversized relative to the terminal 300 such that gaps are formed between inner surfaces 290 of the inner housing 204 and the sides of the terminal 300. For example, a first channel gap 294 may be provided between the first inner wall 265 at the front 264 of the inner housing 204 and the first side 354 of the terminal 300 and a second channel gap 296 may be provided between the second inner wall 267 at the rear 266 of the inner housing 204 and the second side 356 of the terminal 300. The channel gaps 294, 296 are narrow compared to the overall width of the terminal channel 256 but provides some play and movement between the terminal 300 and the inner housing 204.

When the first and second busbars 106, 108 are offset in the first direction (FIG. 9) (for example, the first busbar axis 126 is offset from the second busbar axis 136), the inner housing 204 may be moved relative to the outer housing 202 to accommodate the misalignment and/or the terminal 300 may be moved relative to the inner housing 204 to accommodate the misalignment.

In various embodiments, the inner housing 204 may be rotated such that the lower end 254 is shifted to the right and the upper end 252 is shifted to the left. The size of the cavity 206 relative to the inner housing 204 allows the limited amount of confined movement of the inner housing 204 (for example, rotation) within the cavity 206. The cavity gaps 284, 286 accommodate the movement of the inner housing 204 relative to the outer housing 202. The size of the cavity gaps 284, 286 may vary as the inner housing 204 moves relative to the outer housing 202. For example, as the inner housing 204 rotated from a non-tilted position (FIG. 8) to a tilted position (FIG. 9), the first cavity gap 284 may get narrower at the upper end 252 and wider at the lower end 254. Conversely, the second cavity gap 286 may get wider at the upper end 252 and narrower at the lower end 254. The inner housing 204 may be rotated until the inner housing 204 bottoms out against the outer housing 202. As such, the outer housing 202 confines the amount of rotation of the inner housing 204. For example, the front 264 of the inner housing 204 bottoms out at one side of the cavity 206 against the outer housing 202 while the rear 266 of the inner housing 204 bottoms out at the opposite sides of the cavity 206 against the outer housing 202. The inner housing 204 may be tilted at any angle between the non-tilted position and the maximum tilted position where the inner housing 204 bottoms out against the outer housing 202.

During mating, the terminal base 302 may move (for example, rotate and/or shift laterally) relative to the inner housing 204 between a first position (no-tilt) and a second position (tilted) to accommodate misalignment of the first busbar 106 and the second busbar 108 in the terminal channel 256. The terminal base 302 rotates in the terminal channel 256 to shift relative positions of the upper mating end 304 and the lower mating end 306 to accommodate for the misalignment.

In various embodiments, the terminal 300 may be rotated relative to the inner housing 204 such that the lower mating end 306 is shifted to the right and the upper mating end 304 is shifted to the left. The size of the terminal channel 256 relative to the terminal 300 allows the limited amount of confined movement of the terminal 300 (for example, rotation) within the terminal channel 256. The channel gaps 294, 296 accommodate the movement of the terminal 300 relative to the inner housing 204. The size of the channel gaps 294, 296 may vary as the terminal 300 moves relative to the inner housing 204. For example, as the terminal 300 rotated from a non-tilted position (FIG. 8) to a tilted position (FIG. 9), the first channel gap 294 may get narrower at the upper end 252 and wider at the lower end 254. Conversely, the second channel gap 296 may get wider at the upper end 252 and narrower at the lower end 254. The terminal 300 may be rotated until the terminal 300 bottoms out against the inner housing 204. As such, the inner housing 204 confines the amount of rotation of the terminal 300. For example, the first side of the terminal 300 bottoms out at the first inner wall 265 while the second side of the terminal 300 bottoms out at the second inner wall 267. The terminal 300 may be tilted at any angle between the non-tilted position and the maximum tilted position where the terminal 300 bottoms out against the inner housing 204. In an exemplary embodiment, the first upper spring beam 312 is closer to the first inner wall 265 than the first lower spring beam 322 in the tilted position. Similarly, the second lower spring beam 324 is closer to the second inner wall 267 than the second upper spring beam 314 in the tilted position.

In an exemplary embodiment, the cavity 206 extends along a cavity axis. The cavity axis extends between the upper end 212 and the lower end 214 of the outer housing 202. In various embodiments, the cavity axis extends generally vertically. In an exemplary embodiment, the terminal channel 256 extends along a channel axis. The channel axis extends between the upper opening 257 at the upper end 252 and the lower opening 258 of the lower end 254 of the inner housing 204. In various embodiments, the channel axis extends generally vertically. However, to accommodate the misalignment of the busbars 106, 108, the inner housing 204 may be pivoted such that the channel axis is at a tilt angle that is nonparallel to the cavity axis. In an exemplary embodiment, the terminal 300 extends along a terminal axis 140 between the upper socket 310 and the lower socket 320. To accommodate the misalignment of the busbars 106, 108, the terminal 300 may be pivoted such that the terminal axis 140 is at a tilt angle that is nonparallel to the channel axis.

When the first and second busbars 106, 108 are offset in the second direction (FIG. 10) (for example, the first busbar axis 126 is offset from the second busbar axis 136), the inner housing 204 may be moved relative to the outer housing 202 to accommodate the misalignment and/or the terminal 300 may be moved relative to the inner housing 204 to accommodate the misalignment.

In various embodiments, the inner housing 204 may be rotated such that the lower end 254 is shifted to the left and the upper end 252 is shifted to the right. The size of the cavity 206 relative to the inner housing 204 allows the limited amount of confined movement of the inner housing 204 (for example, rotation) within the cavity 206. The size of the cavity gaps 284, 286 may vary as the inner housing 204 moves relative to the outer housing 202. For example, the second cavity gap 286 may get narrower at the upper end 252 and wider at the lower end 254. Conversely, the first cavity gap 284 may get wider at the upper end 252 and narrower at the lower end 254. The inner housing 204 may be rotated until the inner housing 204 bottoms out against the outer housing 202. The inner housing 204 may be tilted at any angle between the non-tilted position (FIG. 8) and the maximum tilted position (FIG. 10) where the inner housing 204 bottoms out against the outer housing 202. To accommodate the misalignment of the busbars 106, 108, the inner housing 204 may be pivoted such that the channel axis is at a tilt angle that is nonparallel to the cavity axis.

In various embodiments, the terminal 300 may be rotated relative to the inner housing 204 such that the lower mating end 306 is shifted to the left and the upper mating end 304 is shifted to the right. The size of the terminal channel 256 relative to the terminal 300 allows the limited amount of confined movement of the terminal 300 (for example, rotation) within the terminal channel 256. The channel gaps 294, 296 accommodate the movement of the terminal 300 relative to the inner housing 204. The size of the channel gaps 294, 296 may vary as the terminal 300 moves relative to the inner housing 204. For example, the first channel gap 294 may get wider at the upper end 252 and narrower at the lower end 254. Conversely, the second channel gap 296 may get narrower at the upper end 252 and wider at the lower end 254. The terminal 300 may be rotated until the terminal 300 bottoms out against the inner housing 204. The terminal 300 may be tilted at any angle between the non-tilted position (FIG. 8) and the maximum tilted position (FIG. 10) where the terminal 300 bottoms out against the inner housing 204. In an exemplary embodiment, the first lower spring beam 322 is closer to the first inner wall 265 than the first upper spring beam 312 in the tilted position. Similarly, the second upper spring beam 314 is closer to the second inner wall 267 than the second lower spring beam 324 in the tilted position. To accommodate the misalignment of the busbars 106, 108, the terminal 300 may be pivoted such that the terminal axis 140 is at a tilt angle that is nonparallel to the channel axis.

Figure 11:
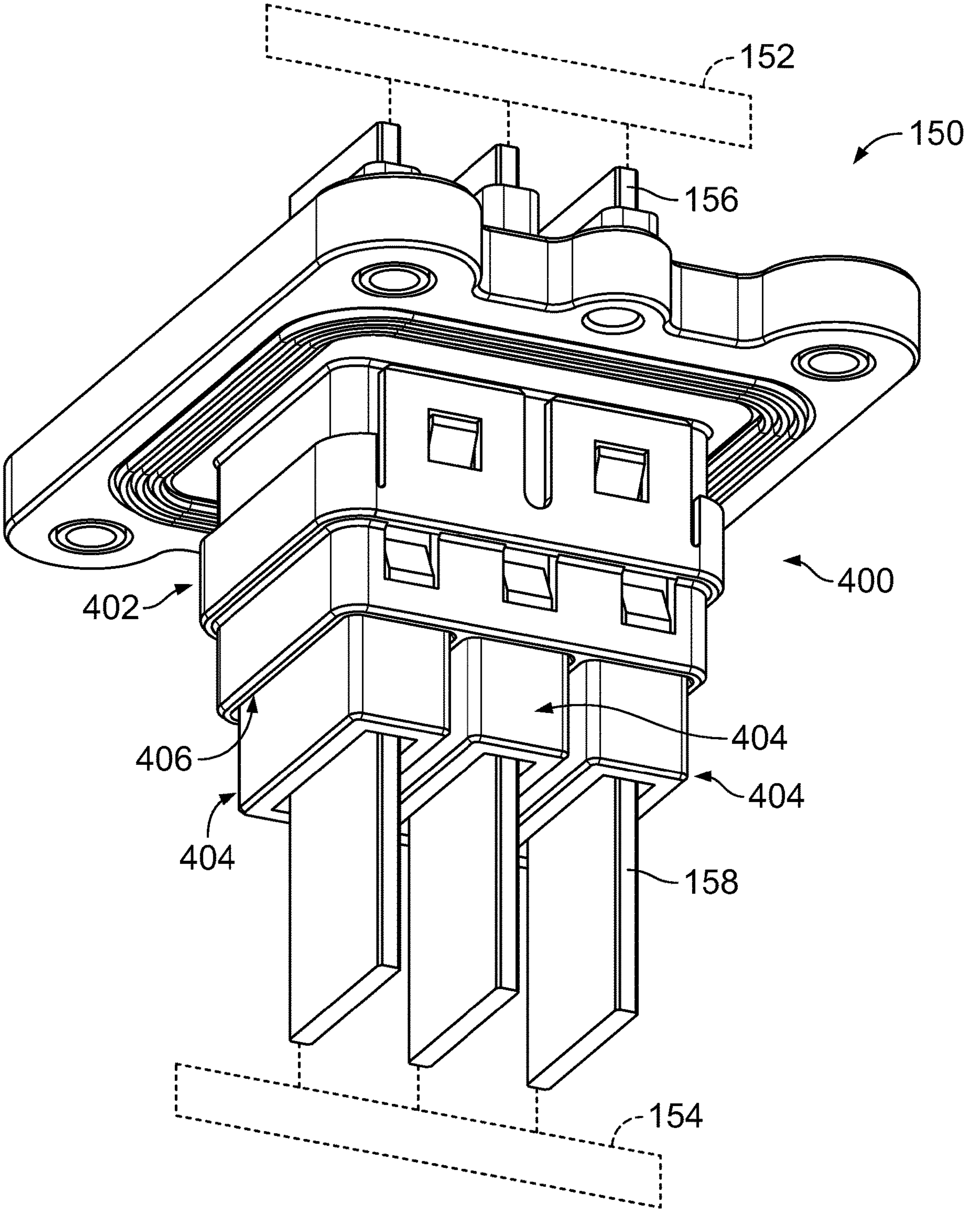
FIG. 11 is a perspective view of a header power connector in accordance with an exemplary embodiment.

FIG. 11 is a perspective view of a header power connector 150 in accordance with an exemplary embodiment. The header power connector 150 is similar to the header connector 100 (shown in FIG. 2). The header power connector 150 is used to electrically connect the first electrical component 152 and the second electrical component 154 (both shown schematically in FIG. 11). In various embodiments, the first and second electrical components 152, 154 may be part of an electric vehicle. For example, the first electrical component 152 may be an inverter and the second electrical component 154 may be an electric motor. The header power connector 150 may be used to electrically connect other types of electrical components in alternative embodiments.

In the illustrated embodiment, the first electrical component 152 is located above the header power connector 150 (may be referred to hereinafter as an upper electrical component 152) and the second electrical component 154 is located below the header power connector 150 (may be referred to hereinafter as a lower electrical component 154). Optionally, the header power connector 150 may be initially mounted to the first electrical component 152 (or the second electrical component 154) and mated to the second electrical component 154 (or the first electrical component 152) when the first electrical component 152 is mounted to the second electrical component 154.

In an exemplary embodiment, the first electrical component 152 includes a plurality of first busbars 156 and the second electrical component 154 includes a plurality of second busbars 158. The first busbars 156 may be referred to hereinafter as upper busbars 156 and the second busbars 158 may be referred to hereinafter as lower busbars 158. The first and second busbars 156, 158 are configured to be plugged directly into opposite ends of the header power connector 150. The header power connector 150 electrically connects the first and second busbars 156, 158 to transmit power between the first and second electrical components 152, 154. In an exemplary embodiment, the busbars 156, 158 of the electrical components 152, 154 are oriented parallel to each other and non-coplanar, as opposed to the header power connector 150, which orient the busbars 156, 158 parallel to each other and coplanar with each other. However, other orientations of the busbars 156, 158 are possible in alternative embodiments.

The header power connector 150 includes a header housing assembly 400 used to hold the terminals 300 (shown in FIG. 3). In an exemplary embodiment, the header housing assembly 400 is a multipiece housing assembly. For example, the header housing assembly 400 includes an outer housing 402 and a plurality of inner housings 404 coupled to the outer housing 402. The inner housings 404 holds the terminals 300. The inner housings 404 are received in a corresponding outer housing cavity 406 of the outer housing 402. In an exemplary embodiment, the outer housing 402 is configured to be mounted to one of the electrical components, such as the second electrical component 154.

In an exemplary embodiment, the inner housings 404 are movable relative to the outer housing 402 to accommodate alignment and mating with the first electrical component 152. For example, each inner housing 404 may be tilted or rotated within the outer housing 402 to accommodate misalignment of the first and second busbars 156, 158. The inner housing 404 has a limited amount of contained movement relative to the outer housing 402. The outer housing 402 is shaped to control and contained the movement of the inner housing 404 during mating. For example, the outer housing 402 may allow the inner housing 404 to rotate or tilt (side to side and/or front to rear) a predetermined amount to allow mating with the busbars 156 of the first electrical component 152 during mating therewith. The inner housings 404 are independently movable relative to each other within the outer housing 402. For example, the inner housings 404 may be tilted or moved to different angles relative to the outer housing 402. In an exemplary embodiment, the terminals 300 also have a limited amount of contained movement relative to the corresponding inner housings 404 to accommodate misalignment of the first and second busbars 156, 158 during mating.

Figure 12:
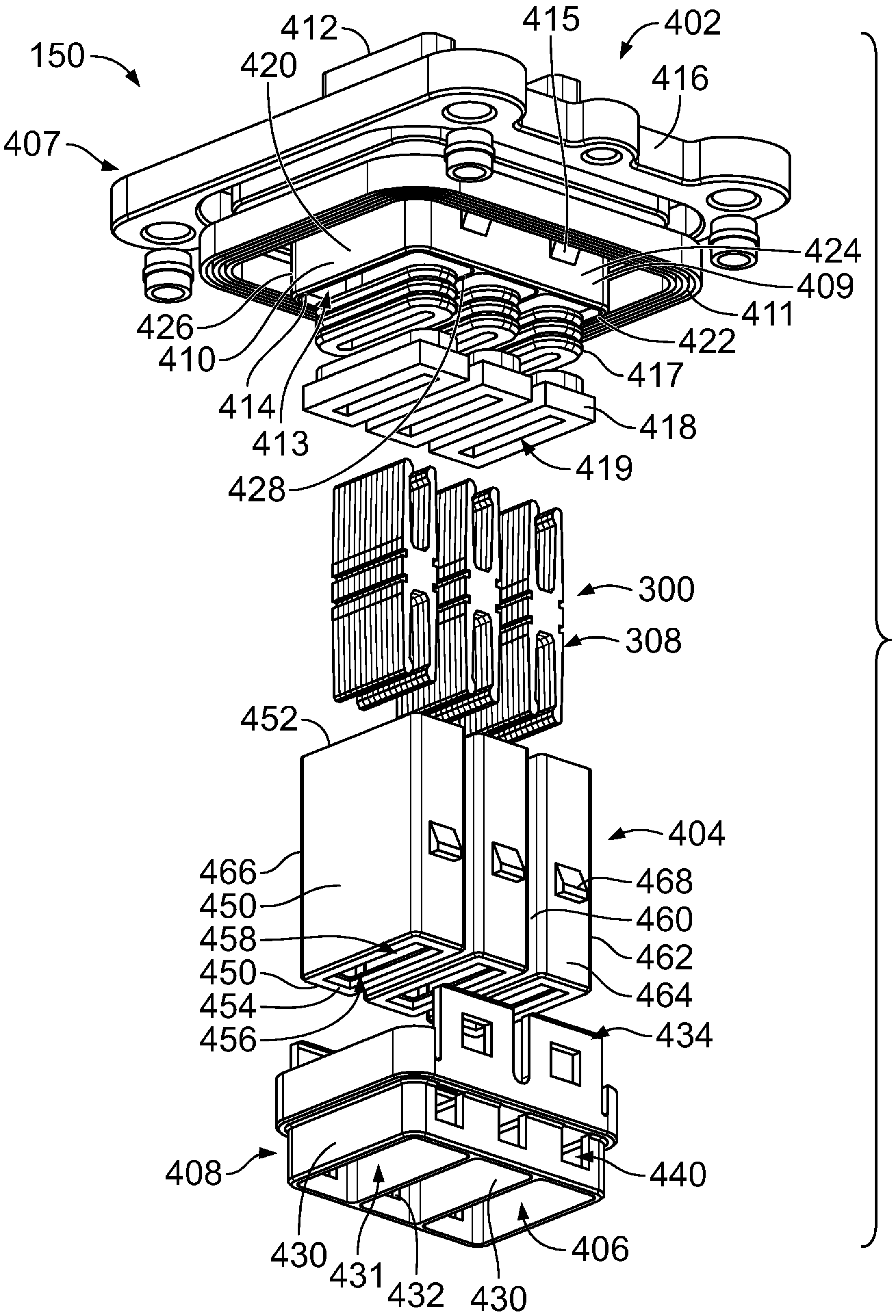
FIG. 12 is an exploded view of the header power connector in accordance with an exemplary embodiment.

FIG. 12 is an exploded view of the header power connector 150 in accordance with an exemplary embodiment. The header power connector 150 includes the outer housing 402, the inner housings 404, and the terminals 300. The terminals 300 are arranged in groups, such as being arranged side-by-side in the terminal stacks 308. The terminals 300 within the terminal stack 308 function as a single terminal assembly. However, the terminals 300, within the terminal stack 308, are independently movable relative to each other. In the illustrated embodiment, each terminal 300 is a double ended socket terminal configured to receive the first and second busbars 156, 158 (shown in FIG. 1) in opposite ends of the terminal 300. Other types of terminals may be used in alternative embodiments.

In an exemplary embodiment, the outer housing 402 is a multipiece housing. For example, the outer housing 402 includes a mount 407 and a clip 408 separate from the mount 407 and coupled to the mount 407. The mount 407 is used to mount the header power connector 150 to the first electrical component 152 or the second electrical component 154. The clip 408 is used to secure the inner housings 404 to the mount 407. The mount 407 and/or the clip 408 form the outer housing cavities 406 that receives the inner housings 404.

The mount 407 of the outer housing 402 includes a base 409 and a mounting flange 416 extending from the base 409. In various embodiments, the header power connector 150 is oriented such that the base 409 extends from the bottom of the mounting flange 416. The mounting flange 416 may receive fasteners to secure the outer housing 402 to the first electrical component 152. In an exemplary embodiment, the mount 407 includes a perimeter seal 411 surrounding the base 409. The perimeter seal 411 is coupled to the mounting flange 416 in the illustrated embodiment. The perimeter seal 411 may be sealed to the first electrical component 152 and/or the second electrical component 154.

The base 409 of the outer housing 402 includes outer walls 410 that surround a base cavity 413, which defines part of the corresponding outer housing cavity 406. The outer walls 410 extend between an upper end 412 and a lower end 414. The terms upper and lower are used herein in reference to the orientation illustrated in the figures; however, other orientations are possible in alternative embodiments. The clip 408 is configured to be coupled to the lower end 414, such as to latching features 415 on the base 409. In the illustrated embodiment, the latching features 415 are latching tabs or catches extending from the base 409. Other types of securing features may be used in alternative embodiments to secure the clip 408 to the base 409. In an exemplary embodiment, the base 409 includes opposite sides 420, 422 and a front 424 and a rear 426 extending between the sides 420, 422. The base cavity 413 is formed between the sides 420, 422 and between the front 424 and the rear 426. The base cavity 413 is open at the lower end 414 to receive the inner housings 404. In various embodiments, the base 409 includes connecting walls 428 extending across the base cavity 413. The connecting walls 428 divide the base cavity 413 into separate pockets or sub-cavities that receive the corresponding inner housings 404.

In an exemplary embodiment, the outer housing 402 includes busbar seals 417 received in the cavity 406, which are sealed to the outer housing 402. The busbar seals 417 are configured to be sealed to the busbars 156. For example, the busbars 156 may pass through openings in the busbar seals 417 to provide a sealed interface to the corresponding busbar 156. In an exemplary embodiment, the outer housing 402 includes caps 418 received in the cavity 406. The caps 418 may be located between corresponding connecting walls 428. The caps 418 may be used to hold the busbar seals 417 in the outer housing 402. The caps 418 may be used to hold the terminals 300 in the inner housings 404. In an exemplary embodiment, each cap 418 includes an opening 419 that receives the corresponding busbar 156. The busbars 156 pass through the openings 419 to interface with the terminals 300.

The clip 408 of the outer housing 402 includes support walls 430 surrounding one or more clip cavity(ies) 431, which forms part of the outer housing cavity 406. The support walls 430 are used to support the inner housings 404 in the clip cavities 431. The support walls 430 extend to edges 432. In the illustrated embodiment, the edges 432 are bottom edges. Optionally, the edges 432 may be chamfered to guide loading of the inner housings 404 into the base cavities 413. The edges 432 may be chamfered to allow tilting of the inner housing 404 relative to the outer housing 402 in the cavity 406, such as to accommodate misalignment of the busbars 156, 158, as described in further detail below.

The clip 408 includes latching features 434 used to secure the clip 408 to the mount 407. For example, the latching features 434 interface with the latching features 415 of the base 409 to secure the clip 408 to the base 409. In the illustrated embodiment, the latching features 434 are deflectable latches configured to be latchably coupled to the latching tabs. The latching features 434 may be releasable to release the clip 408 from the base 409. The latching features 434 may be provided at the front and the rear of the clip 408. Other locations are possible in alternative embodiments. Other types of securing features may be used in alternative embodiments.

The clip 408 includes latching features 440 used to secure the inner housings 404 to the outer housing 402. In the illustrated embodiment, the latching features 440 are openings that receive latching features of the inner housings 404. In various embodiments, the latching features 440 are formed in the support walls 430. Other types of latching features may be used in alternative embodiments.

Each inner housing 404 includes a plurality of inner walls 450 extending between an upper end 452 and a lower end 454. The inner walls 450 form terminal channels 456 configured to receive corresponding terminals 300 therein. The terminal channels 456 are open at the upper end 452 and the lower end 454 to receive the busbars 156, 158, respectively. For example, the inner housing 404 includes upper openings that receive the corresponding first busbar 156 and lower openings that receive the corresponding second busbar 158. The inner walls 450 guide the busbars 156, 158 into the terminal channels 456 to mate with the terminals 300. Optionally, the upper openings and/or the lower openings may include chamfered lead-in surfaces that guide the busbars 156, 158 into the terminal channels 456.

The inner housing 404 includes a first side 460 and a second side 462 opposite the first side 460. The inner housing 404 includes a front 464 and a rear 466 extending between the sides 460, 462. In an exemplary embodiment, the inner housing 404 includes latching features 468 extending from the front 464 and/or the rear 466. The latching features 468 are configured to interface with the latching features 440 of the outer housing 402 to secure the inner housing 404 in the cavity 406 of the outer housing 402. In the illustrated embodiment, the latching features 468 include latches each having a ramp surface at the top of the latch and a catch surface at the bottom of the latch. Other types of latching features may be provided in alternative embodiments.

In an exemplary embodiment, the support walls 430 are relatively short compared to the overall height of the inner wall 450. For example, the support walls 430 may extend less than half the height of the inner wall 450. As such, the inner housing 404 is able to tilt or rotate within the cavity 406 relative to the support walls 430 to accommodate for misalignment of the first and second busbars 156, 158. The chamfered surfaces at the edges 432 of the support walls 430 allow the inner housing 404 to pivot relative to the outer housing 402 for plugging the second busbars 158 into the lower openings 458 of the inner housing 404.

Figure 13:
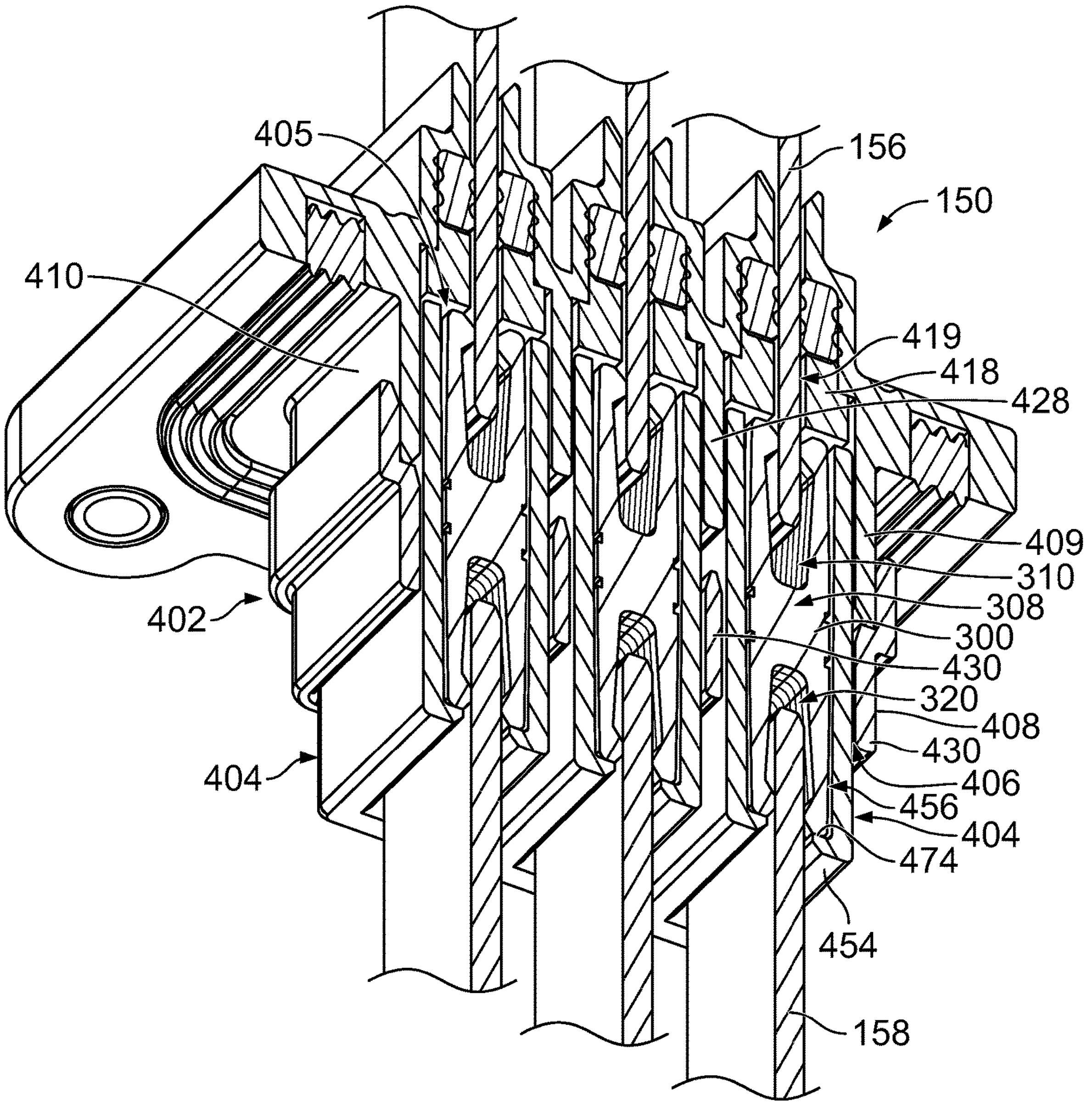
FIG. 13 is a bottom perspective, partial sectional view of the header power connector in accordance with an exemplary embodiment.

FIG. 13 is a bottom perspective, partial sectional view of the header power connector 150 in accordance with an exemplary embodiment. FIG. 13 illustrates the terminals 300 loaded in the terminal channels 456 of the corresponding inner housings 404. The inner housings 404 are loaded in the cavities 406 of the outer housing 402.

In an exemplary embodiment, the terminals 300 are stacked together in corresponding terminal stacks 308. Each terminal channel 456 of the inner housing 404 receives the corresponding terminal stack 308 of the terminals 300. The terminals 300 are arranged side-by-side in the terminal stack 308. The terminals 300 function as a single terminal assembly within the terminal stack 308. However, the terminals 300 are independently movable relative to each other. The terminals 300 may be stamped and formed from thin metal sheets, but stacked together to increase the overall current carrying capacity of the terminal assembly.

When assembled, the outer housing 402 and the inner housing 404 cooperate to form a pocket 405 that receives the corresponding terminal stack 308. The inner housings 404 holds the terminals 300 from below, from the sides, from the front, and from the rear, while the outer housing 402 (for example, the caps 418) holds the terminals 300 from above enclosing the pocket 405. In an exemplary embodiment, the inner housing 404 includes lips 474 at the lower end 454 extending inward from the front 464 and the rear 466. The lips 474 are provided on opposite sides of the lower opening. The lips 474 support the terminals 300 in the pocket 405. The lower opening is aligned with the lower socket 320 to receive the second busbar 158. In an exemplary embodiment, the opening 419 in the cap 418 is aligned with the upper opening of the inner housing 404. The opening 419 is aligned with the upper socket 310 to receive the first busbar 156. For example, the first busbar 156 passes through the opening 419 and through the upper opening of the inner housing 404 into the terminal channel 456 to interface with the terminals 300.

In an exemplary embodiment, the terminal channel 456 is oversized relative to the terminal 300 to allow a limited amount of confined movement of the terminals 300 within the terminal channel 456. For example, gaps may be provided between the walls of the inner housings 404 and the terminals 300 to allow movement of the inner housings 404 relative to the clip 408. The terminals 300 may be shifted front to rear and/or shifted side to side and/or rotated or pivoted top to bottom for mating with the first and second busbars 156, 158. For example, when the first and second busbars 156, 158 are offset from each other, the terminals 300 may be shifted or moved within the terminal channel 456 to accommodate for the misalignment.

In an exemplary embodiment, the cavity 406 of the outer housing 402 is oversized relative to the inner housings 404 to allow a limited amount of confined movement of the inner housings 404 within the cavity 406. For example, gaps may be provided between the inner housings 404 and the support walls 430 of the clip 408 to allow movement of the inner housings 404 relative to the clip 408. Gaps may be provided between the inner housings 404 and the walls of the base 409, such as the outer walls 410 and/or the connecting walls

428 to allow movement of the inner housings 404 relative to the base 409. In an exemplary embodiment, the inner housings 404 are discrete from each other to allow relative and independent movement of each inner housing 404, such as for aligning the inner housing 404 with the corresponding busbars 156, 158. For example, each inner housing 404 may be shifted front to rear and/or shifted side to side and/or rotated or pivoted top to bottom for mating with the first and second busbars 156, 158. For example, when the first and second busbars 156, 158 are offset from each other, the inner housing 404 may be shifted or moved within the cavity 406 to accommodate for the misalignment.

Figure 14:
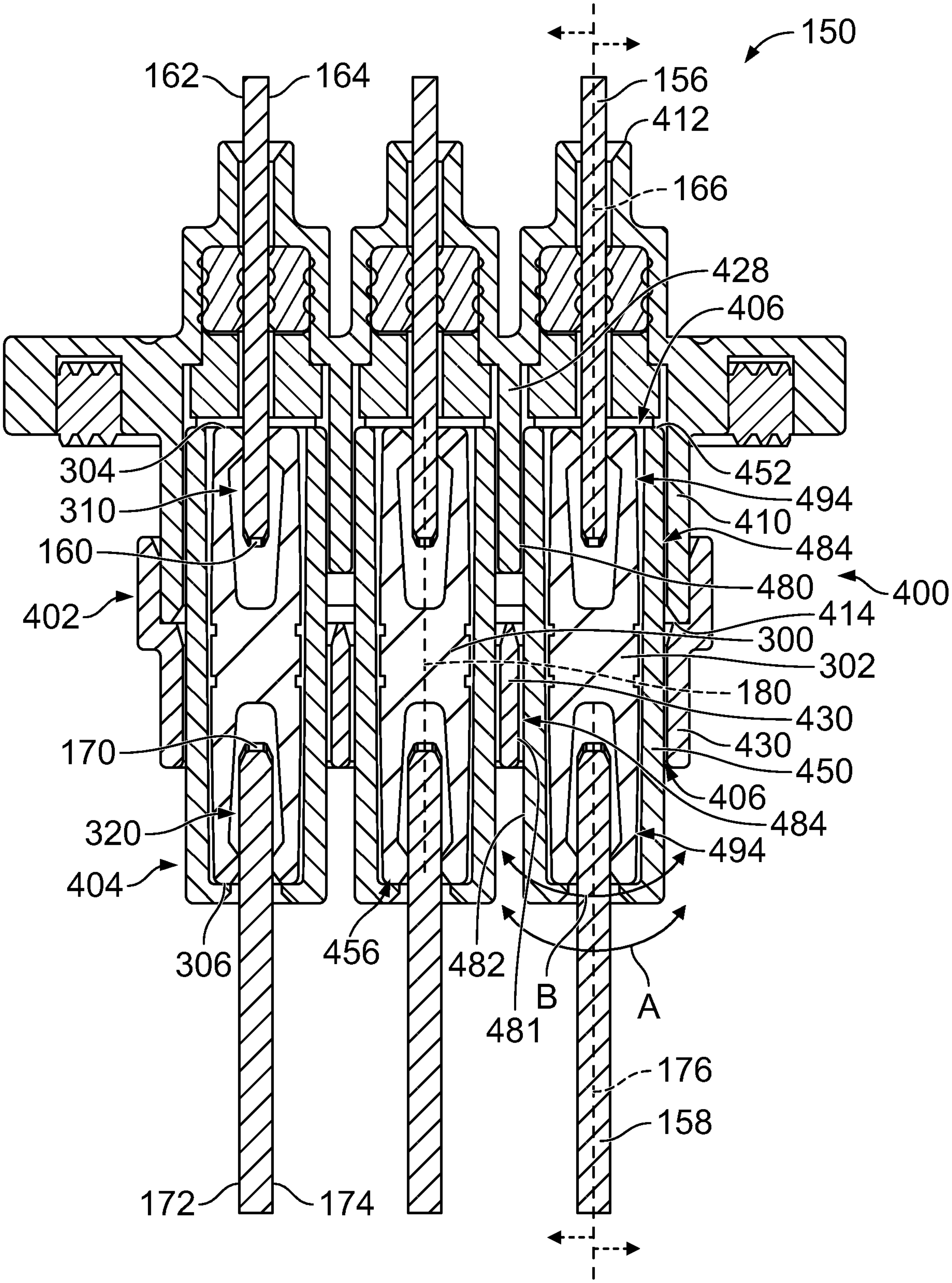
FIG. 14 is a cross-sectional view of the header power connector in accordance with an exemplary embodiment showing the header power connector mated with the first and second busbars.

FIG. 14 is a cross-sectional view of the header power connector 150 in accordance with an exemplary embodiment showing the header power connector 150 mated with the first and second busbars 156, 158. FIG. 14 shows at least some of the first and second busbars 156, 158 offset or misaligned. The inner housings 404 are moved relative to the outer housing 402 to accommodate the misalignment. The terminals 300 are moved relative to the inner housings 404 to accommodate the misalignment.

Each first (upper) busbar 156 includes a first busbar edge 160 configured to be plugged into the header power connector 150. The first busbar 156 includes a first side 162 and a second side 164. The first busbar 156 extends along a first busbar axis 166. The first busbar axis 166 is centered between the first side 162 and the second side 164. In the illustrated embodiment, the first busbar axis 166 is oriented vertically; however, the first busbar axis 166 may be oriented at a skewed angle that is non-vertical. In alternative embodiments, the header power connector 150 may be oriented such that the first busbar 156 is mated in a different orientation, such as a horizontal orientation.

Each second (lower) busbar 158 includes a second busbar edge 170 configured to be plugged into the header power connector 150. The second busbar 158 includes a first side 172 and a second side 174. Optionally, the second busbar 158 may have a width between the first and second sides 172, 174 is equal to the width of the first busbar 156. The second busbar 158 extends along a second busbar axis 176. The second busbar axis 176 is centered between the first side 172 and the second side 174. In the illustrated embodiment, the second busbar axis 176 is oriented vertically; however, the second busbar axis 176 may be oriented at a skewed angle that is non-vertical. In alternative embodiments, the header power connector 150 may be oriented such that the second busbar 158 is mated in a different orientation, such as a horizontal orientation.

When the first and second busbars 156, 158 are aligned (for example, the first busbar axis 166 being parallel to and coincident with the second busbar axis 176), the first and second busbars 156, 158 may be plugged directly into the terminal channel 456 to mate with the terminal 300. However, due to manufacturing tolerances, the first and second busbars 156, 158 may be offset or misaligned (for example, nonparallel and/or shifted forward or rearward and/or shifted right or left).

Tolerances are built into the header power connector 150 to accommodate plugging the first and second busbars 156, 158 into the terminal channel 456. For example, tolerances are built into the outer housing 402 and the inner housings 404 and tolerances are built into the terminals 300 and the terminal channels 456 of the inner housings 404. In various embodiments, the cavities 406 are oversized relative to the inner housings 404 such that cavity gaps 484 are formed between outer surfaces 482 of the inner walls 450 and inner surfaces 480, 481 of the walls of the outer housing 402 (for example, the outer walls 410 and the connecting walls 428) and the walls of the inner housing 404 (for example, the support walls 430). The cavity gaps 484 are narrow compared to the overall width of the header housing assembly 400 but provides some play and movement between the inner housings 404 and the outer housing 402. In various embodiments, the terminal channels 456 are oversized relative to the terminals 300 such that terminal gaps 494 are formed between inner surfaces 480 of the inner housings 404 and the sides of the terminals 300. The terminal gaps 494 are narrow compared to the overall width of the terminal channels 456 but provides some play and movement between the terminals 300 and the inner housings 404.

When the first and second busbars 156, 158 are offset (for example, the first busbar axis 166 is offset from the second busbar axis 176), the corresponding inner housing 404 may be moved relative to the outer housing 402 to accommodate the misalignment and/or the terminal 300 may be moved relative to the inner housing 404 to accommodate the misalignment.

In various embodiments, the inner housing 404 may be rotated (arrow A) such that the lower end 454 is shifted to the right and the upper end 452 is shifted to the left. The size of the cavity 406 relative to the inner housing 404 allows the limited amount of confined movement of the inner housing 404 (for example, rotation) within the cavity 406. The cavity gap 484 accommodates the movement of the inner housing 404 relative to the outer housing 402. The size of the cavity gap 484 may vary as the inner housing 404 moves relative to the outer housing 402. For example, as the inner housing 404 rotates from a non-tilted position to a tilted position, the cavity gap 484 may get narrower at one end and wider at the other end. The inner housing 404 may be rotated until the inner housing 404 bottoms out against the outer housing 402. As such, the outer housing 402 confines the amount of rotation of the inner housing 404. For example, the front 464 of the inner housing 404 bottoms out at one side of the cavity 406 against the outer housing 402 while the rear 466 of the inner housing 404 bottoms out at the opposite sides of the cavity 406 against the outer housing 402. The inner housing 404 may be tilted at any angle between the non-tilted position and the maximum tilted position where the inner housing 404 bottoms out against the outer housing 402.

During mating, the terminal base 302 may move (for example, rotate and/or shift laterally) relative to the inner housing 404 between a first position (no-tilt) and a second position (tilted) to accommodate misalignment of the first busbar 156 and the second busbar 158 in the terminal channel 456. The terminal base 302 rotates (arrow B) in the terminal channel 456 to shift relative positions of the upper mating end 304 and the lower mating end 306 to accommodate for the misalignment. The movement of the terminal 300 is independent of the movement of the inner housing 404.

In various embodiments, the terminal 300 may be rotated relative to the inner housing 404 such that the lower mating end 306 is shifted to the right and the upper mating end 304 is shifted to the left. The size of the terminal channel 456 relative to the terminal 300 allows the limited amount of confined movement of the terminal 300 (for example, rotation) within the terminal channel 456. The terminal gap 494 accommodates the movement of the terminal 300 relative to the inner housing 404. The size of the terminal gap 494 may vary as the terminal 300 moves relative to the inner housing 404. For example, as the terminal 300 rotates from a non-tilted position to a tilted position, the terminal gap 494 may get narrower at one end and wider at the opposite end.

The terminal 300 may be rotated until the terminal 300 bottoms out against the inner housing 404. As such, the inner housing 404 confines the amount of rotation of the terminal 300. The terminal 300 may be tilted at any angle between the non-tilted position and the maximum tilted position where the terminal 300 bottoms out against the inner housing 404.

In an exemplary embodiment, the cavity 406 extends along a cavity axis. The cavity axis extends between the upper end 412 and the lower end 414 of the outer housing 402. In various embodiments, the cavity axis extends generally vertically. In an exemplary embodiment, the terminal channel 456 extends along a channel axis. The channel axis extends between the upper end 452 and the lower end 454 of the inner housing 404. In various embodiments, the channel axis extends generally vertically. However, to accommodate the misalignment of the busbars 156, 158, the inner housing 404 may be pivoted such that the channel axis is at a tilt angle that is nonparallel to the cavity axis. In an exemplary embodiment, the terminal 300 extends along a terminal axis 180 between the upper socket 310 and the lower socket 320. To accommodate the misalignment of the busbars 156, 158, the terminal 300 may be pivoted such that the terminal axis 180 is at a tilt angle that is nonparallel to the channel axis.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A header power connector comprising:

a header housing assembly including an outer housing having a first cavity and a second cavity, the header housing assembly including a first inner housing received in the first cavity and a second inner housing received in the second cavity, the first inner housing including a first terminal channel, the second inner housing including a second terminal channel, the first and second inner housings configured to receive upper busbars, the first and second inner housings configured to receive lower busbars, wherein the first inner housing is movable relative to the outer housing in the first cavity to accommodate misalignment of the corresponding upper and lower busbars in the first terminal channel and the second inner housing is movable relative to the outer housing in the second cavity to accommodate misalignment of the corresponding upper and lower busbars in the second terminal channel;

a first terminal received in the first terminal channel, the first terminal including an upper mating end having an upper socket configured to receive the corresponding upper busbar and a lower mating end having a lower socket configured to receive the corresponding lower busbar, the first terminal is configured to electrically connect the corresponding upper and lower busbars, wherein the first terminal is movable in the first terminal channel to accommodate misalignment of the corresponding upper and lower busbars in the first terminal channel; and a second terminal received in the second terminal channel, the second terminal including an upper mating end having an upper socket configured to receive the corresponding upper busbar and a lower mating end having a lower socket configured to receive the corresponding lower busbar, the second terminal is configured to electrically connect the corresponding upper and lower busbars, wherein the second terminal is movable in the second terminal channel to accommodate misalignment of the corresponding upper and lower busbars in the second terminal channel.

2. The header power connector of claim 1, wherein the first inner housing is independently movable relative to the second inner housing.

3. The header power connector of claim 1, wherein the header housing assembly includes a third inner housing received in a third cavity of the outer housing, the third inner housing including a third terminal channel configured to receive a corresponding upper busbar and lower busbar, wherein the third inner housing is movable relative to the outer housing in the third cavity to accommodate misalignment of the corresponding upper and lower busbars, the header power connector further comprising a third terminal received in the third terminal channel, the third terminal including an upper mating end having an upper socket configured to receive the corresponding upper busbar and a lower mating end having a lower socket configured to receive the corresponding lower busbar, the third terminal is configured to electrically connect the corresponding upper and lower busbars, wherein the third terminal is movable in the third terminal channel to accommodate misalignment of the corresponding upper and lower busbars in the third terminal channel.

4. The header power connector of claim 1, wherein the first terminal channel is oversized relative to the first terminal to allow shifting of the first terminal between a first position and a second position to accommodate misalignment of the corresponding upper and lower busbars in the first terminal channel, and wherein the second terminal channel is oversized relative to the second terminal to allow shifting of the second terminal between a second position and a second position to accommodate misalignment of the corresponding upper and lower busbars in the second terminal channel.

5. The header power connector of claim 1, wherein the outer housing includes a mount and a clip separate from the mount and coupled to the mount, the mount having a base including a chamber, the clip including a perimeter wall surrounding the first and second cavities, the clip including a separating wall between the first cavity and the second cavity, the clip including a latching feature coupled to the base to secure the clip to the base, the first inner housing being coupled to the clip and held in the chamber by the clip, the second inner housing being coupled to the clip and held in the chamber by the clip, wherein the first inner housing is movable relative to the clip and the base and the second inner housing is movable relative to the clip and the base.

6. The header power connector of claim 1, wherein the first terminal includes a terminal base, an upper mating end above the terminal base and a lower mating end below the terminal base, the upper mating end including the upper socket flanked by upper spring beams to engage opposite sides of the corresponding upper busbar, the lower mating end including the lower socket flanked by lower spring beams to engage opposite sides of the corresponding lower busbar, wherein the terminal base moves relative to the first inner housing between a first position and a second position to accommodate misalignment of the first busbar and the second busbar in the terminal channel.

7. The header power connector of claim 1, wherein the first inner housing rotates in the first cavity to shift relative positions of the first inner wall and the outer wall to accommodate misalignment of the corresponding upper and lower busbars in the first terminal channel, and wherein the second inner housing rotates in the second cavity to shift relative positions of the second inner wall and the outer wall to accommodate misalignment of the corresponding upper and lower busbars in the second terminal channel.

8. The header power connector of claim 1, wherein the first terminal channel extends along a first channel axis and the second terminal channel extends along a second channel axis, the first and second inner housings independently movable relative to the outer housing to change relative orientations of the first and second channel axes.

9. The header power connector of claim 1, wherein the first terminal channel extends along a first channel axis, the first terminal extending along a first terminal axis between the upper socket and the lower socket, the first terminal being movable within the first terminal channel to orient the first terminal axis nonparallel to the first channel axis to accommodate misalignment of the corresponding upper and lower busbars in the first terminal channel, and wherein the second terminal channel extends along a second channel axis, the second terminal extending along a second terminal axis between the upper socket and the lower socket, the second terminal being movable within the second terminal channel to orient the second terminal axis nonparallel to the second channel axis to accommodate misalignment of the corresponding upper and lower busbars in the second terminal channel.

10. A header power connector comprising:

a header housing assembly including an outer housing having a first cavity and a second cavity, the header housing assembly including a first inner housing received in the first cavity and a second inner housing received in the second cavity, the first inner housing including a first terminal channel, the second inner housing including a second terminal channel, the first and second inner housings configured to receive upper busbars, the first and second inner housings configured to receive lower busbars;

a first terminal received in the first terminal channel, the first terminal including an upper mating end having an upper socket configured to receive the corresponding upper busbar and a lower mating end having a lower socket configured to receive the corresponding lower busbar, the first terminal is configured to electrically connect the corresponding upper and lower busbars; and a second terminal received in the second terminal channel, the second terminal including an upper mating end having an upper socket configured to receive the corresponding upper busbar and a lower mating end having a lower socket configured to receive the corresponding lower busbar, the second terminal is configured to electrically connect the corresponding upper and lower busbars;

wherein the first inner housing is movable at various tilt angles relative to the outer housing between a positive inner housing tilt position and a negative inner housing tilt position, the first inner housing being positionable at a no-tilt angle centered between the positive inner housing tilt position and the negative inner housing tilt position, the first inner housing movable relative to the outer housing to accommodate misalignment of the corresponding upper and lower busbars in the first terminal channel;

wherein the second inner housing is movable at various tilt angles relative to the outer housing between a positive inner housing tilt position and a negative inner housing tilt position, the second inner housing being positionable at a no-tilt angle centered between the positive inner housing tilt position and the negative inner housing tilt position, the second inner housing movable relative to the outer housing to accommodate misalignment of the corresponding upper and lower busbars in the second terminal channel;

wherein the first terminal is movable in the first terminal channel at various tilt angles relative to the first inner housing between a positive terminal tilt position and a negative terminal tilt position, the first terminal being positionable at a no-tilt angle centered between the positive terminal tilt position and the negative terminal tilt position, the first terminal movable relative to the first inner housing to accommodate misalignment of the corresponding upper and lower busbars in the first terminal channel; and wherein the second terminal is movable in the second terminal channel at various tilt angles relative to the second inner housing between a positive terminal tilt position and a negative terminal tilt position, the second terminal being positionable at a no-tilt angle centered between the positive terminal tilt position and the negative terminal tilt position, the second terminal movable relative to the second inner housing to accommodate misalignment of the corresponding upper and lower busbars in the second terminal channel.

11. The header power connector of claim 10, wherein the first terminal channel is oversized relative to the first terminal to allow shifting of the first terminal between the positive terminal tilt position and the negative terminal tilt position to accommodate misalignment of the corresponding upper and lower busbars in the first terminal channel, and wherein the second terminal channel is oversized relative to the second terminal to allow shifting of the second terminal between the positive terminal tilt position and the negative terminal tilt position to accommodate misalignment of the corresponding upper and lower busbars in the second terminal channel.

12. The header power connector of claim 10, wherein the first inner housing is independently movable relative to the second inner housing.

13. The header power connector of claim 10, wherein the header housing assembly includes a third inner housing received in a third cavity of the outer housing, the third inner housing including a third terminal channel configured to receive a corresponding upper busbar and lower busbar, wherein the third inner housing is movable relative to the outer housing in the third cavity to accommodate misalignment of the corresponding upper and lower busbars, the header power connector further comprising a third terminal received in the third terminal channel, the third terminal including an upper mating end having an upper socket configured to receive the corresponding upper busbar and a lower mating end having a lower socket configured to receive the corresponding lower busbar, the third terminal is configured to electrically connect the corresponding upper and lower busbars, wherein the third terminal is movable in the third terminal channel at various tilt angles relative to the third inner housing between a positive terminal tilt position and a negative terminal tilt position, the third terminal being positionable at a no-tilt angle centered between the positive terminal tilt position and the negative terminal tilt position, the third terminal movable relative to the third inner housing to accommodate misalignment of the corresponding upper and lower busbars in the third terminal channel.

14. The header power connector of claim 10, wherein the first terminal channel is oversized relative to the first terminal to allow shifting of the first terminal between the positive terminal tilt position and the negative terminal tilt position to accommodate misalignment of the corresponding upper and lower busbars in the first terminal channel, and wherein the second terminal channel is oversized relative to the second terminal to allow shifting of the second terminal between the positive terminal tilt position and the negative terminal tilt position to accommodate misalignment of the corresponding upper and lower busbars in the second terminal channel.

15. The header power connector of claim 10, wherein the outer housing includes a mount and a clip separate from the mount and coupled to the mount, the mount having a base including a chamber, the clip including a perimeter wall surrounding the first and second cavities, the clip including a separating wall between the first cavity and the second cavity, the clip including a latching feature coupled to the base to secure the clip to the base, the first inner housing being coupled to the clip and held in the chamber by the clip, the second inner housing being coupled to the clip and held in the chamber by the clip, wherein the first inner housing is movable relative to the clip and the base and the second inner housing is movable relative to the clip and the base.

16. The header power connector of claim 10, wherein the first terminal includes a terminal base, an upper mating end above the terminal base and a lower mating end below the terminal base, the upper mating end including the upper socket flanked by upper spring beams to engage opposite sides of the corresponding upper busbar, the lower mating end including the lower socket flanked by lower spring beams to engage opposite sides of the corresponding lower busbar, wherein the terminal base moves relative to the first inner housing between the positive terminal tilt position and the negative terminal tilt position to accommodate misalignment of the first busbar and the second busbar in the terminal channel.

17. The header power connector of claim 10, wherein the first inner housing rotates in the first cavity to shift relative positions of the first inner wall and the outer wall between the positive inner housing tilt position and the negative inner housing tilt position to accommodate misalignment of the corresponding upper and lower busbars in the first terminal channel, and wherein the second inner housing rotates in the second cavity to shift relative positions of the second inner wall and the outer wall between the positive inner housing tilt position and the negative inner housing tilt position to accommodate misalignment of the corresponding upper and lower busbars in the second terminal channel.

18. The header power connector of claim 10, wherein the first terminal channel extends along a first channel axis and the second terminal channel extends along a second channel axis, the first and second inner housings independently movable relative to the outer housing between the positive inner housing tilt position and the negative inner housing tilt position to change relative orientations of the first and second channel axes.

19. The header power connector of claim 10, wherein the first terminal channel extends along a first channel axis, the first terminal extending along a first terminal axis between the upper socket and the lower socket, the first terminal being movable within the first terminal channel between the positive terminal tilt position and the negative terminal tilt position to orient the first terminal axis nonparallel to the first channel axis to accommodate misalignment of the corresponding upper and lower busbars in the first terminal channel, and wherein the second terminal channel extends along a second channel axis, the second terminal extending along a second terminal axis between the upper socket and the lower socket, the second terminal being movable within the second terminal channel between the positive terminal tilt position and the negative terminal tilt position to orient the second terminal axis nonparallel to the second channel axis to accommodate misalignment of the corresponding upper and lower busbars in the second terminal channel.

20. A power connector system comprising:

a first upper busbar and a second upper busbar for powering a first electrical component, the first and second upper busbars having upper busbar edges;

a first lower busbar and a second lower busbar for powering a second electrical component, the first and second lower busbars having lower busbar edges; and a header power connector for electrically connecting the first and second upper busbars with the first and second lower busbars, the header power connector comprising:

a header housing assembly including an outer housing having a first cavity and a second cavity, the header housing assembly including a first inner housing received in the first cavity and a second inner housing received in the second cavity, the first inner housing including a first terminal channel, the second inner housing including a second terminal channel, the first inner housing receiving the first upper busbar and the first lower busbar, the second inner housing receiving the second upper busbar and the second lower busbar, wherein the first inner housing is movable relative to the outer housing in the first cavity to accommodate misalignment of the first upper and lower busbars in the first terminal channel, the second inner housing being movable relative to the outer housing in the second cavity to accommodate misalignment of the second upper and lower busbars in the second terminal channel;

a first terminal received in the first terminal channel, the first terminal including an upper mating end having an upper socket configured to receive the first upper busbar and a lower mating end having a lower socket configured to receive the first lower busbar, the first terminal is configured to electrically connect the first upper and lower busbars, wherein the first terminal is movable in the first terminal channel to accommodate misalignment of the first upper and lower busbars in the first terminal channel; and a second terminal received in the second terminal channel, the second terminal including an upper mating end having an upper socket configured to receive the second upper busbar and a lower mating end having a lower socket configured to receive the second lower busbar, the second terminal is configured to electrically connect the second upper and lower busbars, wherein the second terminal is movable in the second terminal channel to accommodate misalignment of the second upper and lower busbars in the second terminal channel.

* * * * *